(12) United States Patent
Leefer

(10) Patent No.: US 11,886,201 B2
(45) Date of Patent: *Jan. 30, 2024

(54) ROAD-BASED VEHICLE GUIDANCE SYSTEM

(71) Applicant: Glydways Inc., South San Francisco, CA (US)

(72) Inventor: Nathan Leefer, San Francisco, CA (US)

(73) Assignee: Glydways Inc., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,321

(22) Filed: Mar. 10, 2023

(65) Prior Publication Data

US 2023/0205225 A1    Jun. 29, 2023

Related U.S. Application Data

(63) Continuation of application No. 16/591,254, filed on Oct. 2, 2019, now Pat. No. 11,604,476.

(60) Provisional application No. 62/742,132, filed on Oct. 5, 2018.

(51) Int. Cl.
| | |
|---|---|
| *G05D 1/02* | (2020.01) |
| *B60W 30/18* | (2012.01) |
| *B60W 30/09* | (2012.01) |
| *H04L 67/12* | (2022.01) |
| *B60W 30/12* | (2020.01) |

(52) U.S. Cl.
CPC ........... *G05D 1/0263* (2013.01); *B60W 30/09* (2013.01); *B60W 30/12* (2013.01); *B60W 30/18163* (2013.01); *G05D 1/0223* (2013.01); *H04L 67/12* (2013.01); *G05D 2201/0213* (2013.01)

(58) Field of Classification Search
CPC ............... G05D 1/0263; G05D 1/0223; G05D 2201/0213; B60W 30/09; B60W 30/12; B60W 30/18163; H04L 67/12
See application file for complete search history.

(56) References Cited

U.S. PATENT DOCUMENTS

| | | | | |
|---|---|---|---|---|
| 5,191,528 A | * | 3/1993 | Yardley .................. | G05D 1/027 318/587 |
| 5,938,707 A | * | 8/1999 | Uehara ................ | G05D 1/0261 701/41 |
| 6,122,573 A | * | 9/2000 | Higashi ............ | G08G 1/096783 180/167 |
| 6,378,772 B1 | | 4/2002 | Yonemura | |

(Continued)

*Primary Examiner* — Angelina Shudy
(74) *Attorney, Agent, or Firm* — Brownstein Hyatt Farber Schreck, LLP

(57) ABSTRACT

A vehicle may include a frame structure, a body mounted to the frame structure, and a vehicle navigation system. The vehicle navigation system may include a navigation sensor mounted to the frame structure, and a processor in communication with the navigation sensor. The navigation sensor may be configured to detect reference elements disposed in or on a road on which the vehicle travels. The processor may be configured to receive, from the navigation sensor, signals indicative of a sequence or pattern of detected reference elements. The processor may also be configured to determine, using the received signals, at least one of a position, velocity, or orientation of the vehicle on the road.

20 Claims, 14 Drawing Sheets

(56) References Cited

U.S. PATENT DOCUMENTS

| | | | |
|---|---|---|---|
| 7,451,027 B2* | 11/2008 | Peteri | G06F 3/0238 |
| | | | 701/41 |
| 7,990,286 B2 | 8/2011 | Shankwitz et al. | |
| 8,078,349 B1 | 12/2011 | Prada Gomez et al. | |
| 8,174,374 B2 | 5/2012 | Yim et al. | |
| 8,175,796 B1 | 5/2012 | Blackburn et al. | |
| 10,286,908 B1* | 5/2019 | Wengreen | G06V 20/588 |
| 10,754,348 B2 | 8/2020 | McClendon | |
| 10,915,111 B1* | 2/2021 | Argenti | G01C 21/28 |
| 10,928,830 B1* | 2/2021 | Tran | G06N 3/045 |
| 10,969,245 B2* | 4/2021 | Yamamoto | B62D 15/029 |
| 11,136,022 B2 | 10/2021 | Matta et al. | |
| 11,157,017 B2* | 10/2021 | Yamamoto | G08G 1/00 |
| 11,169,538 B2 | 11/2021 | Williams et al. | |
| 11,237,011 B2* | 2/2022 | Yeung | G05D 1/0261 |
| 11,287,263 B2 | 3/2022 | Yamamoto | |
| 11,294,090 B2 | 4/2022 | Yamamoto et al. | |
| 11,308,811 B2* | 4/2022 | Yamamoto | G08G 1/167 |
| 11,334,087 B2 | 5/2022 | Yamamoto | |
| 11,427,237 B2 | 8/2022 | Khosla | |
| 11,604,476 B1* | 3/2023 | Leefer | G05D 1/0223 |
| 11,687,088 B2* | 6/2023 | Yamamoto | G01C 21/3407 |
| | | | 701/445 |
| 2005/0107946 A1 | 5/2005 | Shimizu | |
| 2006/0293810 A1 | 12/2006 | Nakamoto | |
| 2007/0294024 A1 | 12/2007 | Sasaki | |
| 2009/0115638 A1 | 5/2009 | Shankwitz | |
| 2009/0287376 A1 | 11/2009 | Aso | |
| 2010/0145600 A1 | 6/2010 | Son | |
| 2010/0328054 A1 | 12/2010 | Yim | |
| 2011/0153136 A1* | 6/2011 | Anderson | G05D 1/0274 |
| | | | 348/E7.086 |
| 2015/0081211 A1 | 3/2015 | Zeng | |
| 2015/0247719 A1* | 9/2015 | Huang | B62D 15/025 |
| | | | 701/41 |
| 2016/0082957 A1 | 3/2016 | Zsombory | |
| 2016/0132705 A1 | 5/2016 | Kovarik | |
| 2016/0282867 A1 | 9/2016 | Yamamura | |
| 2017/0003688 A1 | 1/2017 | Zheng | |
| 2017/0025017 A1 | 1/2017 | Thomas | |
| 2017/0113696 A1 | 4/2017 | Oh | |
| 2018/0061238 A1 | 3/2018 | Lei | |
| 2018/0157878 A1* | 6/2018 | Kovarik | E01F 9/578 |
| 2018/0165526 A1 | 6/2018 | Yoon | |
| 2018/0170377 A1 | 6/2018 | Tatsukawa | |
| 2018/0282955 A1 | 10/2018 | Mcclendon | |
| 2018/0283904 A1 | 10/2018 | Yamamoto | |
| 2018/0305874 A1 | 10/2018 | Yamamoto | |
| 2018/0305875 A1 | 10/2018 | Yamamoto | |
| 2018/0328741 A1 | 11/2018 | Pratt | |
| 2019/0027040 A1 | 1/2019 | Ogawa | |
| 2019/0064345 A1* | 2/2019 | Reed | G05D 1/0257 |
| 2019/0080612 A1* | 3/2019 | Weissman | G01S 19/42 |
| 2019/0096260 A1 | 3/2019 | Ahn | |
| 2019/0098468 A1 | 3/2019 | Yamamoto | |
| 2019/0196496 A1 | 6/2019 | Yamamoto | |
| 2019/0228204 A1 | 7/2019 | Park | |
| 2019/0272389 A1* | 9/2019 | Viente | G05D 1/0212 |
| 2019/0390974 A1 | 12/2019 | Alqudah | |
| 2020/0012294 A1 | 1/2020 | Yamamoto | |
| 2020/0088902 A1* | 3/2020 | Yamamoto | G08G 1/09623 |
| 2020/0110420 A1 | 4/2020 | Yamamoto | |
| 2020/0133299 A1 | 4/2020 | Yamamoto | |
| 2020/0284586 A1 | 9/2020 | Yamamoto | |
| 2020/0285822 A1 | 9/2020 | Yamamoto | |
| 2020/0306989 A1 | 10/2020 | Vogel | |
| 2020/0320870 A1 | 10/2020 | Yamamoto | |
| 2020/0332483 A1* | 10/2020 | Michiharu | E01C 23/163 |
| 2020/0340825 A1 | 10/2020 | Yamamoto | |
| 2020/0357027 A1 | 11/2020 | Yamamoto | |
| 2021/0004983 A1* | 1/2021 | Fischer | G06T 7/70 |
| 2021/0034065 A1 | 2/2021 | Camacho Perez | |
| 2021/0081624 A1 | 3/2021 | Kovarik | |
| 2021/0089858 A1 | 3/2021 | Yamamoto | |
| 2021/0150905 A1 | 5/2021 | Yamamoto | |
| 2021/0165419 A1 | 6/2021 | Yamamoto | |
| 2021/0213930 A1* | 7/2021 | Sengupta | B60R 11/04 |
| 2021/0215507 A1 | 7/2021 | Yamamoto | |
| 2021/0240195 A1* | 8/2021 | Atherton | G05D 1/0038 |
| 2021/0270634 A1 | 9/2021 | Fujita | |
| 2021/0271258 A1* | 9/2021 | Tran | G05D 1/0088 |
| 2021/0271261 A1 | 9/2021 | Yamamoto | |
| 2021/0300381 A1 | 9/2021 | Hong | |
| 2021/0300388 A1 | 9/2021 | Yamamoto | |
| 2021/0312802 A1 | 10/2021 | Chen | |
| 2021/0331703 A1* | 10/2021 | Duan | B60W 60/0027 |
| 2021/0340715 A1 | 11/2021 | Yamamoto | |
| 2021/0402988 A1 | 12/2021 | Zhang | |
| 2021/0402992 A1* | 12/2021 | Morimoto | B60W 30/12 |
| 2022/0011102 A1 | 1/2022 | Yamamoto | |
| 2022/0013045 A1* | 1/2022 | Takeda | B60W 60/0017 |
| 2022/0057807 A1 | 2/2022 | Yamada | |
| 2022/0068129 A1 | 3/2022 | Yamamoto | |
| 2022/0074757 A1 | 3/2022 | Edelman | |
| 2022/0075385 A1 | 3/2022 | Yamamoto | |
| 2022/0137631 A1* | 5/2022 | Udagawa | G06V 20/56 |
| | | | 701/28 |
| 2022/0165072 A1* | 5/2022 | S | G06V 10/764 |
| 2022/0284225 A1 | 9/2022 | Lev | |
| 2022/0326023 A1* | 10/2022 | Xu | G01C 21/3807 |
| 2023/0168672 A1* | 6/2023 | Kameyama | G05D 1/0225 |
| | | | 701/26 |
| 2023/0222899 A1* | 7/2023 | Thomas | G08G 1/0175 |
| | | | 701/468 |
| 2023/0305576 A1* | 9/2023 | Chase | G08G 1/0145 |
| | | | 701/2 |

* cited by examiner

ROAD-BASED VEHICLE GUIDANCE SYSTEM

CROSS-REFERENCE TO RELATED APPLICATION(S)

This application is a continuation patent application of U.S. patent application Ser. No. 16/591,254, filed Oct. 2, 2019, and titled "Road-Based Vehicle Guidance System" and claims the benefit of U.S. Provisional Patent Application No. 62/742,132, filed Oct. 5, 2018 and titled "Road-Based Vehicle Guidance System," the disclosures of which are hereby incorporated herein by reference in their entirety.

FIELD

The described embodiments relate generally to vehicles, and, more particularly, to a road-based vehicle guidance system that includes reference elements disposed in or on a road, and a vehicle navigation system that enables a vehicle to navigate the road in response to detecting the reference elements.

BACKGROUND

Vehicles, such as cars, trucks, vans, busses, trams, and the like, are ubiquitous in modern society. Cars, trucks, and vans are frequently used for personal transportation to transport relatively small numbers of passengers, while busses, trams, and other large vehicles are frequently used for public transportation. Vehicles may also be used for package transport or other purposes.

SUMMARY

A vehicle may include a frame structure, a body mounted to the frame structure, and a vehicle navigation system. The vehicle navigation system may include a navigation sensor mounted to the frame structure, and a processor in communication with the navigation sensor. The navigation sensor may be configured to detect reference elements disposed in or on a road on which the vehicle travels. The processor may be configured to receive, from the navigation sensor, signals indicative of a sequence or pattern of detected reference elements. The processor may also be configured to determine, using the received signals, at least one of a position, velocity, or orientation of the vehicle on the road.

A method of navigating a road by a vehicle may include detecting, by the vehicle, a sequence or pattern of reference elements disposed in or on a road over which the vehicle travels. The method may also include determining, from the sequence or pattern of reference elements, at least one of a position, velocity, or orientation of the vehicle on the road, and providing a steering correction to a steering system of the vehicle in response to the determined position, velocity, and/or orientation of the vehicle on the road. Additionally or alternatively, a speed correction may be provided to a drive system or brake system of the vehicle in response to the determined position, velocity, and/or orientation.

A road may include a composite material that includes concrete or asphalt, and a set of reference elements (e.g., magnetic markers) disposed in or on the composite material.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
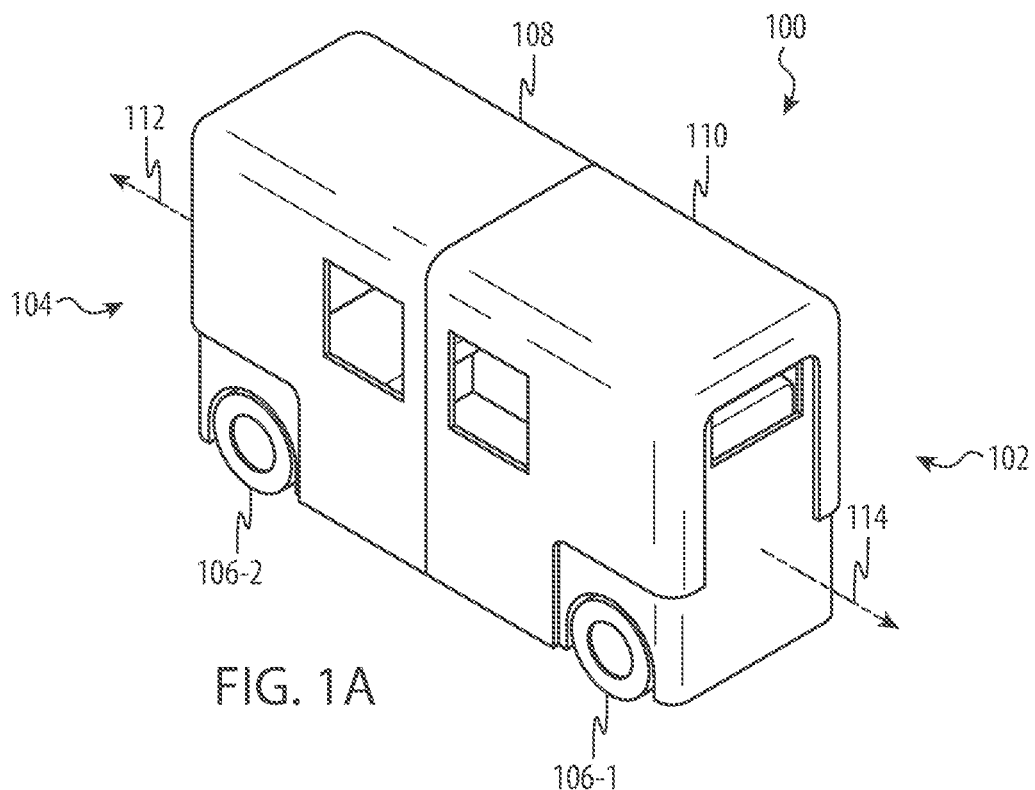
FIGS. 1A-1B depict an example vehicle.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to vehicles that may be used in a transportation system in which numerous vehicles may be autonomously operated to transport passengers and/or freight. For example, a transportation system or service may provide a fleet of vehicles that operate along a roadway to pick up and drop off passengers at either pre-set locations or stops, or at dynamically selected locations (e.g., selected by a person via a smartphone). While the vehicles may be adapted for independent operation, the vehicle fleet or portions of the vehicle fleet may be controlled by a central processing unit or computerized system.

Vehicles in such a transportation system may be configured to operate autonomously. As used herein, the term "autonomous" may refer to a mode or scheme in which vehicles can operate without continuous, manual control by a human operator. For example, vehicles may navigate along a roadway (and without an on-board driver) using a system of sensors that guide the vehicle, and a system of automatic drive and steering mechanisms that control the speed and direction of the vehicle. In some cases, the vehicles may not require steering, speed, or directional control from the passengers, and may exclude controls such as passenger-accessible accelerator and brake pedals, steering wheels, and other manual controls. In some cases, the vehicles may include manual drive controls that may be used for maintenance, emergency overrides, or the like. Such controls may be hidden, stowed, or otherwise not directly accessible by a user during normal vehicle operation. For example, they may be designed to be accessed only by trained operators, maintenance personnel, or the like.

Autonomous operation need not exclude all human or manual operation of the vehicles or of the transportation system as a whole. For example, human operators may be able to intervene in the operation of a vehicle for safety, convenience, testing, or other purposes. Such intervention may be local to the vehicle, such as when a human driver takes controls of the vehicle, or remotely, such as when an operator sends commands to the vehicle via a remote control system. Similarly, some aspects of the vehicles may be controlled by passengers of the vehicles. For example, a passenger in a vehicle may select a target destination, a route, a speed, control the operation of the doors and/or windows, or the like. Accordingly, it will be understood that the terms "autonomous" and "autonomous operation" do not necessarily exclude all human intervention or operation of the individual vehicles or of the overall transportation system.

The vehicles in an autonomous transportation system as described herein may be operated on a fully public roadway, or on a closed system of lanes. A closed system of lanes may, for example, include a lane or set of lanes that is adjacent a public roadway, and that in some cases shares a common tarmac road surface. In cases where a closed system of lanes is used, the lanes may be customized for the operation of the vehicles and the transportation system as a whole. The lanes may have reference elements (e.g., markers, signs, fiducials, or other objects or components) on, in, or proximate the lanes to help the vehicles operate. For example, vehicles may include navigation sensors that can sense reference elements (e.g., magnetic markers) that are embedded in the road surface to help guide the vehicles and allow the vehicles to determine their position, velocity (speed), orientation, or the like. As another example, the roadway may have signs or other indicators that can be detected by cameras on the vehicle, and that provide information such as location, speed limit, traffic flow patterns, and the like.

The vehicles in the transportation may include various sensors, cameras, communications systems, processors, and/or other components or systems that help facilitate autonomous operation. For example, the vehicles may include a sensor array that detects magnetic poles or other reference elements embedded in the road surface and which help the vehicle determine its position, velocity, and/or orientation on the roadway. The vehicles may also include wireless vehicle-to-vehicle communications systems, such as optical communications systems, that allow the vehicles to inform one another of operational parameters such as their braking status, acceleration status, their next maneuver (e.g., right turn, left turn, planned stop), their number or type of payload (e.g., humans or freight), or the like. The vehicles may also include wireless communications systems to facilitate communication with a central operations system that has supervisory command and control authority over the transportation system.

The vehicles in the transportation system may be designed to enhance the operation and convenience of the transportation system. For example, a primary purpose of the transportation system may be to provide comfortable, convenient, rapid, and efficient personal transportation. To provide personal comfort, the vehicles may be designed for easy passenger ingress and egress, and may have comfortable seating arrangements with generous legroom and headroom. The vehicles may also have a sophisticated suspension system that provides a comfortable ride and a dynamically adjustable parameters to help keep the vehicle level, positioned at a convenient height, and to ensure a comfortable ride throughout a range of variable load weights.

Conventional personal automobiles are designed for operation primarily in only one direction. This is due in part to the fact that drivers are oriented forwards, and operating in reverse for long distances is generally not safe or necessary. However, in autonomous vehicles, where humans are not directly controlling the operation of the vehicle in real-time, it may be advantageous for a vehicle to be able to operate bidirectionally. For example, the vehicles in a transportation system as described herein may be substantially symmetrical, such that the vehicles lack a visually or mechanically distinct front or back. Further, the wheels may be controlled sufficiently independently so that the vehicle may operate substantially identically no matter which end of the vehicle is facing the direction of travel. This symmetrical design provides several advantages. For example, the vehicle may be able to maneuver in smaller spaces by potentially eliminating the need to make U-turns or other maneuvers to re-orient the vehicles so that they are facing "forward" before initiating a journey.

Figure 1B:
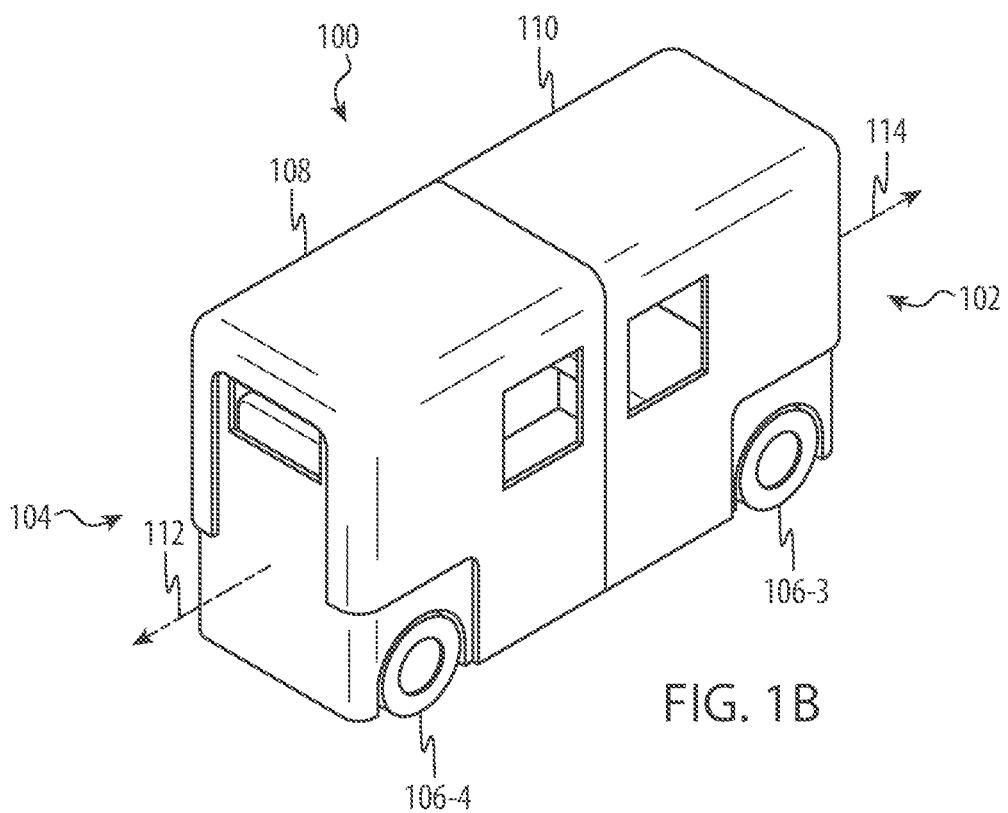

FIGS. 1A and 1B are perspective views of an example vehicle 100 that may be used in a transportation system as described herein. FIGS. 1A-1B illustrate the symmetry and bidirectionality of the vehicle 100. In particular, the vehicle 100 defines a first end 102, shown in the forefront in FIG. 1A, and a second end 104, shown in the forefront in FIG. 1B. In some examples and as shown, the first and second ends 102, 104 are substantially identical. Moreover, the vehicle 100 may be configured so that it can be driven with either end facing the direction of travel. For example, when the vehicle 100 is travelling in the direction indicated by arrow 114, the first end 102 is the leading end of the vehicle 100, while when the vehicle 100 is traveling in the direction indicated by arrow 112, the second end 104 is the leading end of the vehicle 100.

The vehicle 100 may also include wheels 106 (e.g., 106-1-106-4). The wheels 106 may be paired according to their proximity to an end of the vehicle. Thus, wheels 106-1, 106-3 may be positioned proximate the first end 102 of the vehicle and may be referred to as a first pair of wheels 106, and the wheels 106-2, 106-4 may be positioned proximate the second end 104 of the vehicle and may be referred to as a second pair of wheels 106. Each pair of wheels may be driven by at least one motor (e.g., an electric motor), and each pair of wheels may be able to steer the vehicle. Because each pair of wheels is capable of turning to steer the vehicle, the vehicle may have similar driving and handling characteristics regardless of the direction of travel. In some cases, the vehicle may be operated in a two-wheel steering mode, in which only one pair of wheels steers the vehicle 100 at a given time. In such cases, the particular pair of wheels that steers the vehicle 100 may change when the direction of travel changes. In other cases, the vehicle may be operated in a four-wheel steering mode, in which the wheels are operated in concert to steer the vehicle. In a four-wheel steering mode, the pairs of wheels may either turn in the same direction or in opposite directions, depending on the steering maneuver being performed and/or the speed of the vehicle.

The vehicle 100 may also include doors 108, 110 that open to allow passengers and other payloads (e.g., packages, luggage, freight) to be placed inside the vehicle 100. The doors 108, 110, which are described in greater detail herein, may extend over the top of the vehicle such that they each define two opposite side segments. For example, each door defines a side segment on a first side of the vehicle and another side segment on a second, opposite side of the vehicle. The doors also each define a roof segment that extends between the side segments and defines part of the roof (or top side) of the vehicle. In some cases, the doors 108, 110 resemble an upside-down "U" in cross-section and may be referred to as canopy doors. The side segments and the roof segment of the doors may be formed as a rigid structural unit, such that all of the components of the door (e.g., the side segments and the roof segment) move in concert with one another. In some cases, the doors 108, 110 include a unitary shell or door chassis that is formed from a monolithic structure. The unitary shell or door chassis may be formed from a composite sheet or structure including, for example, fiber glass, carbon composite, and/or other light-weight composite materials.

Figure 2A:
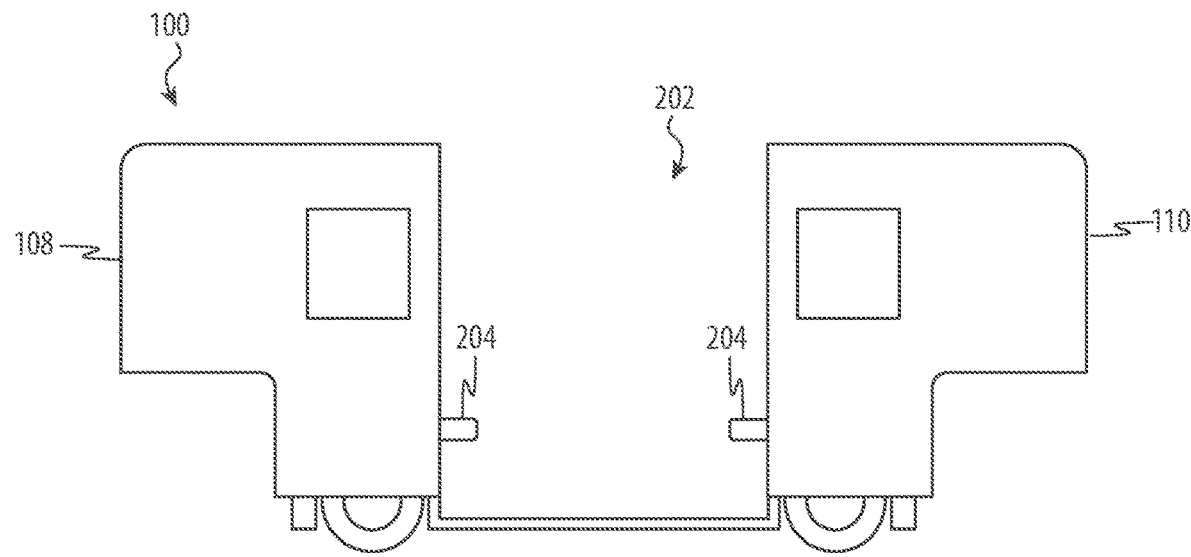
FIGS. 2A-2B depict the vehicle of FIGS. 1A-1B with its doors open.
Figure 2B:
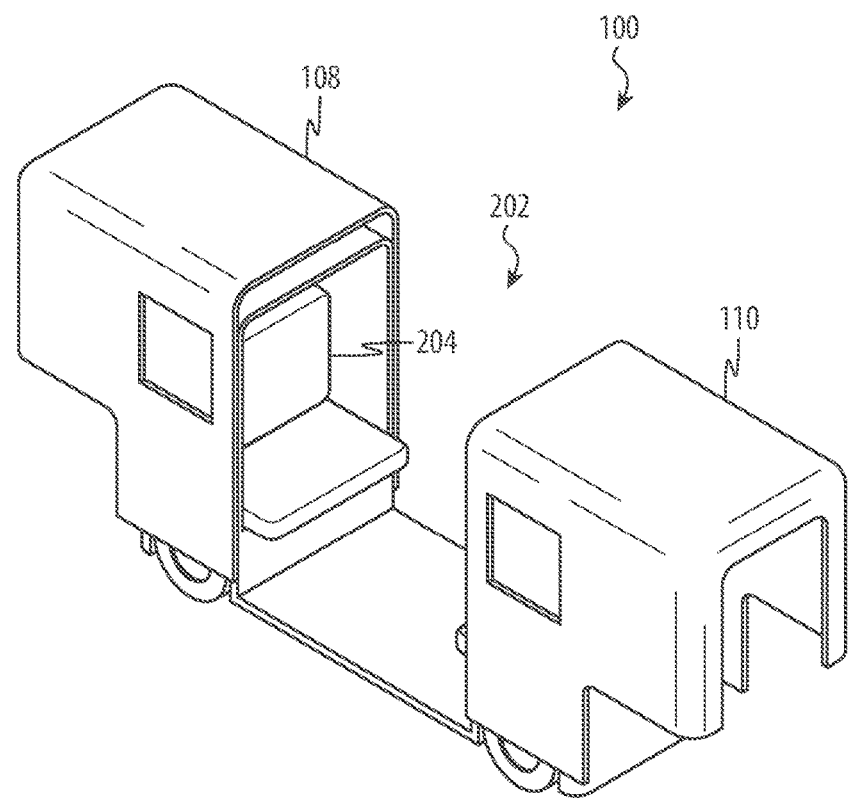

FIGS. 2A and 2B are side and perspective views of the vehicle 100 with the doors 108, 110 in an open state. Because the doors 108, 110 each define two opposite side segments and a roof segment, an uninterrupted internal space 202 may be revealed when the doors 108, 110 are opened. In the example depicted in FIGS. 2A and 2B, when the doors 108, 110 are opened, an open section may be defined between the doors 108, 110 that extends from one side of the vehicle 100 to the other. This may allow for unimpeded ingress and egress into the vehicle 100 by passengers on either side of the vehicle 100. The lack of an overhead structure when the doors 108, 110 are opened may allow passengers to walk across the vehicle 100 without a limit on the overhead clearance.

The vehicle 100 may also include seats 204, which may be positioned at opposite ends of the vehicle 100 and may be facing one another. As shown the vehicle includes two seats 204, though other numbers of seats and other arrangements of seats are also possible (e.g., zero seats, one seat, three seats, etc.). In some cases, the seats 204 may be removed, collapsed, or stowed so that wheelchairs, strollers, bicycles, or luggage may be more easily placed in the vehicle 100.

Figure 3A:
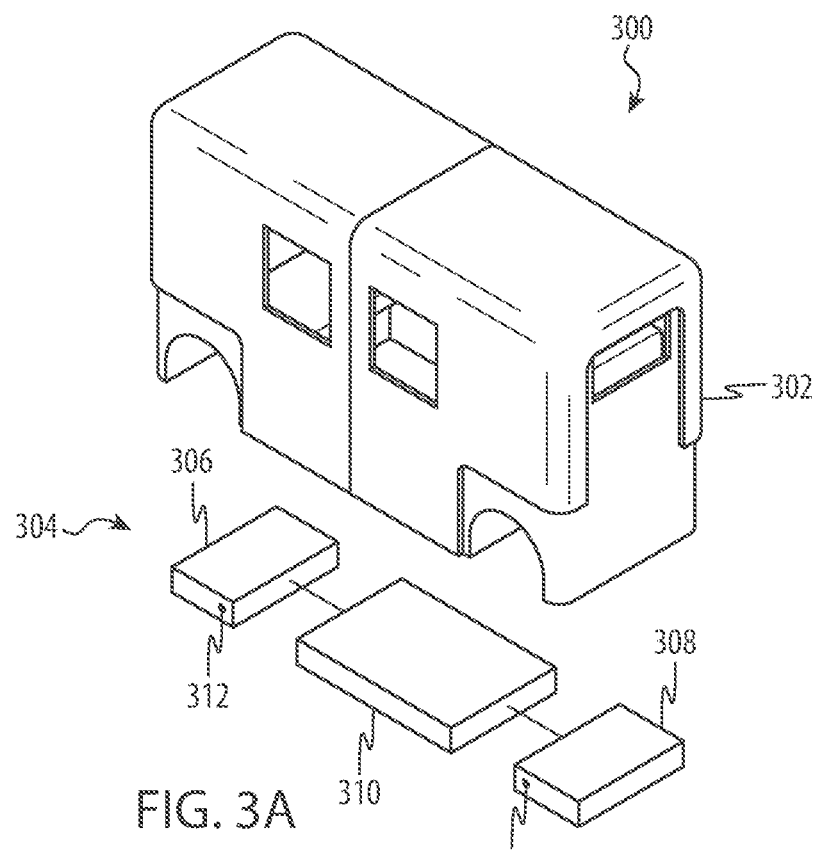
FIG. 3A depicts a partial exploded view of an example configuration of a vehicle.
Figure 3B:
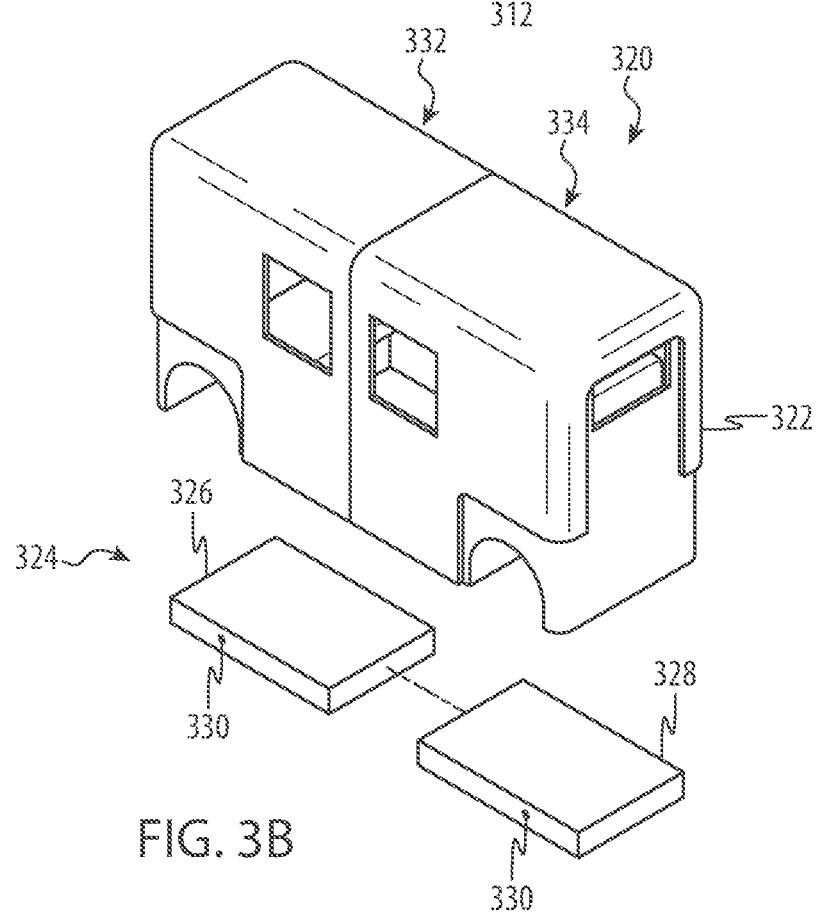
FIG. 3B depicts a partial exploded view of another example configuration of a vehicle.

Vehicles for use in a transportation system as described herein, such as the vehicle 100, may be designed for safe and comfortable operation, as well as for ease of manufacture and maintenance. To achieve these advantages, the vehicles may be designed to have a frame structure that includes many of the structural and operational components of the vehicle (e.g., the motor, suspension, batteries, etc.) and that is positioned low to the ground. A body structure may be attached or secured to the frame structure. FIGS. 3A-3B illustrate partial exploded views of vehicles, which may be embodiments of the vehicle 100, showing example configurations of a frame structure and body structure. As described below, the low position of the frame structure combined with the relatively light-weight body structure produces a vehicle with a very low center of gravity, which increases the safety and handling of the vehicle. For example, a low center of gravity reduces the rollover risk of the vehicle when the vehicle encounters slanted road surfaces, wind loading, sharp turns, or the like, and also reduces body roll of the vehicle during turning or other maneuvers. Further, by positioning many of the operational components of the vehicle, such as motors, batteries, control systems, sensors (e.g., sensors that detect road-mounted magnets or other markers), and the like, on the frame structure, manufacture and repair may be simplified.

FIG. 3A is a partial exploded view of a vehicle 300, which may be an embodiment of the vehicle 100. Details of the vehicle 100 may be equally applicable to the vehicle 300, and will not be repeated here. The vehicle 300 may include a body structure 302, which may include doors (e.g., the doors 108, 110, described above) and other body components, and a frame structure 304 to which the body structure 302 is attached.

The frame structure 304 may be formed by coupling together several structural components. For example, FIG. 3A shows a frame structure 304 that includes a base module 310 and first and second wheel modules 306, 308. The wheel modules 306, 308 may be the same or similar to one another, and may in fact be interchangeable with one another. In this way, assembly and repair may be simplified as wheel modules may be replaced and/or swapped easily and quickly, and fewer unique replacement parts may be necessary to produce and/or store.

The wheel modules 306, 308 may include drive, suspension, and steering components of the vehicle. For example, the wheel modules may include wheel suspension systems (which may define or include wheel mounts, axles, or hubs, represented in FIG. 3A as points 312), steering systems, drive motors, and optionally motor controllers. Wheels may be mounted to the wheel suspension systems via the wheel mounts, axles, hubs or the like. The drive motors may include one or more drive motors that drive the wheels, either independently or in concert with one another. The drive motors may receive power from a power source (e.g., battery) that is mounted on the base module 310. Motor controllers for the drive motors may also be mounted on the wheel modules 306, 308, or they may be mounted on the base module 310.

The suspension systems may be any suitable type of suspension system. In some cases, the suspension systems include independent suspension systems for each wheel. For example, the suspension systems may be double-wishbone torsion-bar suspension systems. The suspension systems may also be dynamically adjustable, such as to control the ride height, suspension preload, damping, or other suspension parameters while the vehicle is stationary or while it is moving. Other suspension systems are also contemplated, such as swing axle suspension, sliding pillar suspension, MacPherson strut suspension, or the like. Moreover, spring and damping functions may be provided by any suitable component or system, such as coil springs, leaf springs, pneumatic springs, hydropneumatic springs, magneto-rheological shock absorbers, and the like.

The wheel modules 306, 308 may also include steering systems that allow the wheels to be turned to steer the vehicle. In some cases the wheels may be independently steerable, or they may be linked (e.g., via a steering rack) so that they always point in substantially the same direction during normal operation of the vehicle. As noted above, because each pair of wheels is steerable, either wheel module 306, 308 may be the leading or trailing wheel module at a given time.

The base module 310 may include components such as batteries, motors and mechanisms for opening and closing the vehicle's doors, control systems (including computers or other processing units), and the like. The wheel modules 306, 308 may be attached to the base module 310 in a secure manner, such as via bolts or other fasteners, interlocking structures, rivets, welds, or the like. In some cases, the wheel modules 306, 308 are removable from the base module 310 in a non-destructive manner (e.g., without having to cut weldments or metal or otherwise damage the structural material of the module) so that the modules may be replaced or disassembled from one another for ease of service or repair. For example, the wheel modules 306, 308 may be removably attached to the base module 310 using one or more threaded fasteners or pins.

FIG. 3B is a partial exploded view of a vehicle 320, which may be an embodiment of the vehicle 100. Details of the vehicle 100 may be equally applicable to the vehicle 320, and will not be repeated here. The vehicle 320 may include a body structure 322, which may include doors (e.g., the doors 108, 110, described above) and other body components, and a frame structure 324 to which the body structure 322 is attached.

Whereas the frame structure 304 in FIG. 3A included a base module and two wheel modules, the frame structure 324 in FIG. 3B includes two wheel modules 326, 328 and no separate base module. The wheel modules 326, 328 may include all of the components of the wheel modules 306, 308 in FIG. 3B, but may also include components that were coupled to or otherwise integrated with the base module 310. For example, each wheel module 326, 328 may include wheel suspension (which may include wheel mounts or axles, illustrated in FIG. 3B as points 330), steering systems, drive motors, and motor controllers.

The wheel modules 326, 328 may also include batteries, control systems (including computers or other processing units), motors and mechanisms for opening and closing the vehicle's doors, and the like. In some cases, components of the wheel modules 326, 328 may be configured to be backup or redundant components. For example, each wheel module 326, 328 may include a control system that is capable of controlling all of the operations of the vehicle, including controlling the components and mechanisms of its own wheel module as well as those of the other wheel module of the frame structure 324. Accordingly, if one control system malfunctions or fails, the other control system on the other wheel module may seamlessly assume operation of the vehicle.

The wheel modules 326, 328 may be attached to one another in a secure manner, such as via bolts or other fasteners, interlocking structures, rivets, welds, or the like. In some cases, the wheel modules 326, 328 are removable from one another in a non-destructive manner (e.g., without having to cut weldments or metal or otherwise damage the structural material of the module) so that the modules may be replaced or disassembled from one another for ease of service or repair. For example, the wheel modules 326, 328 may be removably attached to the base module 310 using one or more threaded fasteners or pins.

While the body structure 322 is shown in FIG. 3B as separate from the frame structure 324, other embodiments may integrate the body structure 322 with the frame structure 324. For example, the body structure 322 may have a first segment 332 and a second segment 334, which may be structurally coupled to the wheel modules 326, 328, respectively. In this way, structural components of the body structure 322 and the frame structure 324 that require or benefit from precise alignment may be assembled to a common substructure, thereby reducing misalignment between those components. For example, as described herein, door mechanisms may include a four-bar linkage with one pivot positioned on the first body segment 332, and another pivot positioned on or near the wheel module 326 (e.g., the wheel module directly below that body segment). By building the first body segment 332 to the underlying wheel module 326, the relative position between these pivots may be more tightly controlled allowing for more predictable or reliable operation of the door mechanism. Additionally, in many cases the alignment between the first and second segments 332, 334 of the body structure 322 may be less important than the alignment between a given segment of the body structure 322 and the underlying wheel module. Accordingly, integrating separate segments of the body structure 322 with separate wheel modules may improve the tolerances and alignment of the components of the vehicle.

FIGS. 3A-3B illustrate example configurations of vehicles and frame structures. Other configurations are also possible, however. Moreover, the frame structures and the body structures shown in FIGS. 3A-3B are intended more as schematic representations of these components, and these components may include other structures that are omitted from FIGS. 3A-3B for clarity. Additional structural connections and integrations may be made between the body structures and the frame structures than are explicitly represented in FIGS. 3A-3B. For example, components a door mechanism that open and close the doors of the body structures may be joined to both the doors and to the frame structures.

As noted above, vehicles for use in a transportation system as described herein may be outfitted with doors that open to provide easy ingress and egress from the vehicle. For example, the doors may open to reveal a large, roofless opening that provides access to the interior volume of the vehicle. As described above, the doors may define portions of two opposite sides of the vehicle, as well as a portion of the top of the vehicle. In order to allow these doors to open in the manner shown and described with respect to FIGS. 2A-2B, the doors may be coupled to the frame and/or a body of the vehicle by door linkage mechanisms that are configured to move the doors between a closed position (as shown in FIG. 1A) and an open position (as shown in FIGS. 2A-2B). As described herein, the door linkage mechanisms may include mechanical linkages, motors, gear systems, and the like.

Figure 4A:
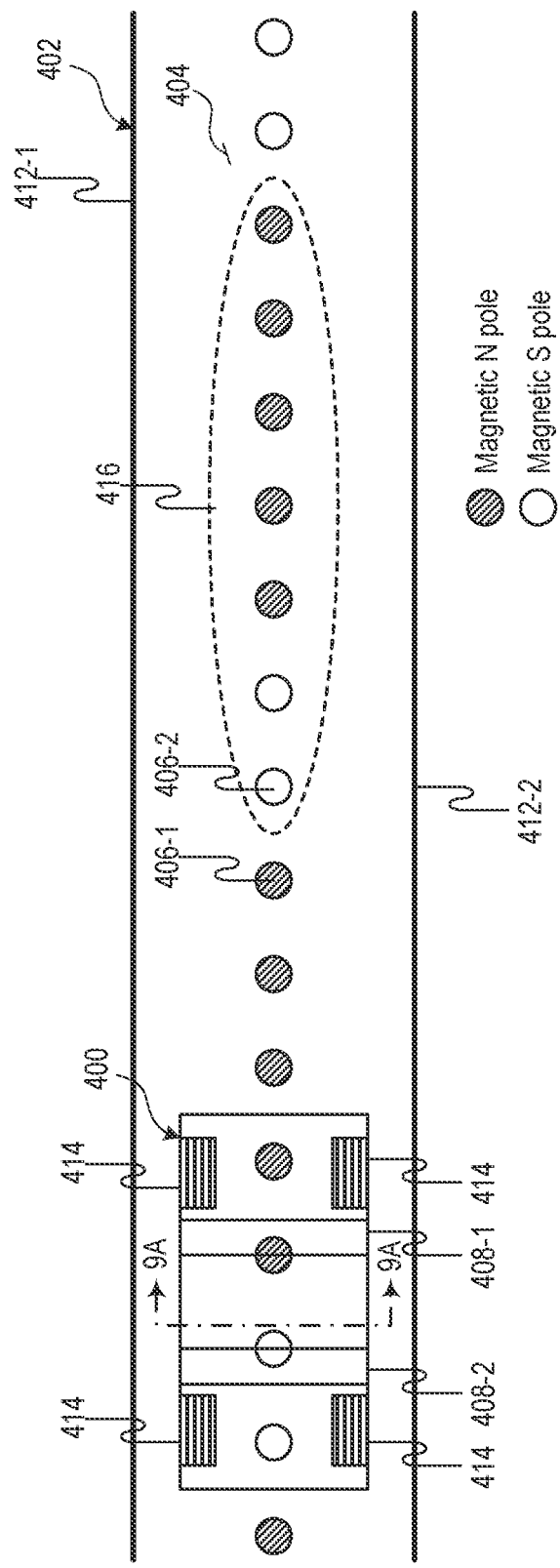
FIG. 4A shows a top plan view of an example vehicle on an example road.

As previously discussed, vehicles such as the vehicles described with reference to FIGS. 1A-3B may be operated on a roadway (e.g., a connected system of roads). FIG. 4A shows a top plan view of an example vehicle 400 on an example road 402. By way of example, the road 402 is shown to include a single lane 404. In alternative embodiments, the road 402 may include two or more lanes. In some embodiments, the vehicle 400 may be one of the vehicles described with reference to FIGS. 1A-3B, or may incorporate aspects of the vehicles described with reference to FIGS. 1A-3B.

The lane 404 or road 402 may include a pattern of reference elements 406 disposed in or on the road 402. The reference elements 406 may variously include magnetic markers (e.g., magnetic poles), optical indicia (e.g., markings or patterns detectable by an optical sensor), radio frequency identification (RFID) tags, and so on. Some reference elements 406 (e.g., magnetic poles 406-1, 406-2) may be more weather independent (e.g., less affected by snow or leaves on the road 402) than other reference elements (e.g., optical indicia). In some examples, the reference elements 406 may be spaced about 1-10 meters apart along the road 402. The reference elements 406 may be centered or offset within the lane 404.

Figure 4B:
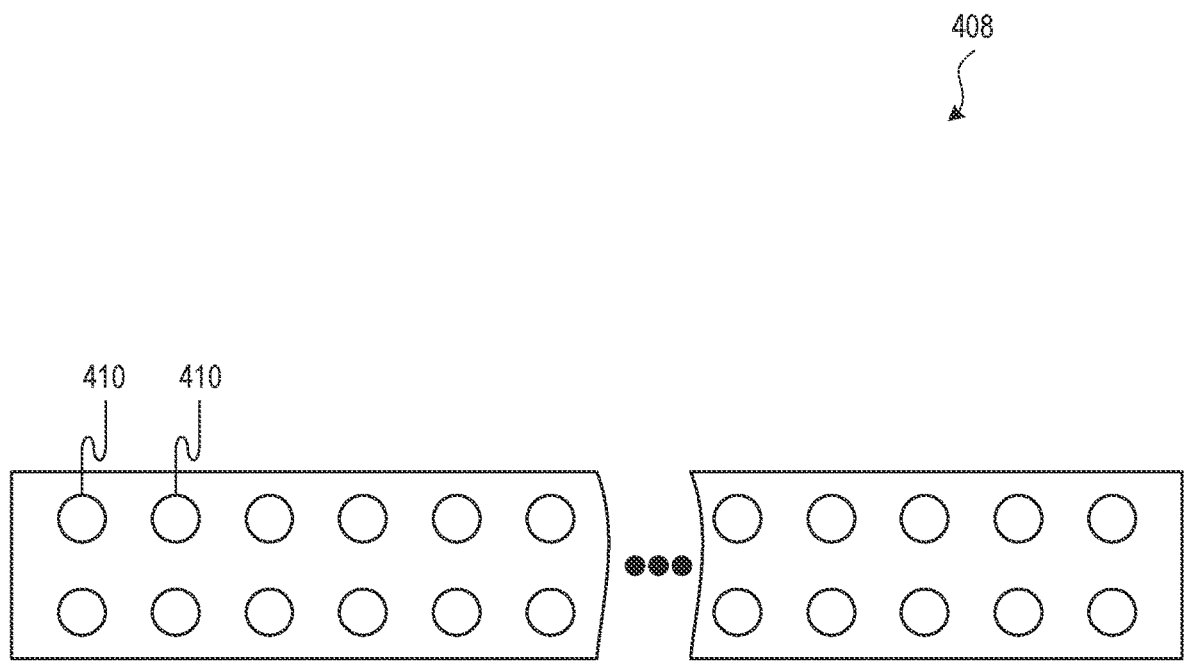
FIG. 4B shows an enlarged view of a sensor array that may be included in the vehicle shown in FIG. 4A.

As shown, the vehicle 400 may have one or more navigation sensors 408 (e.g., navigation sensors 408-1 and 408-2) that are positioned to detect a sequence or pattern of reference elements 406 disposed in or on the road 402. In some embodiments, a navigation sensor 408 may include a sensor array. In some embodiments, the sensor array may include a magnetic sensor array, such as a Hall Effect sensor array. FIG. 4B shows an enlarged view of an example sensor array 408 that may be used as the navigation sensor 408-1 or 408-2 in the vehicle 400 shown in FIG. 4A. By way of example, the sensor array 408 shown in FIG. 4B includes a 2×N array of sensor elements 410. In other embodiments, the sensor array 408 may include any number of sensor elements 410, from a 1×N array of sensor elements 410 to an M×N array of sensor elements 410, where M and N are integers greater than one. In some embodiments, a sensor array may span a majority of the width of a vehicle (e.g., more than 50% of the width of the vehicle 400, or more than 75% of the width of the vehicle 400, or more than 90% of the width of the vehicle 400). As shown in FIG. 4A, the vehicle 400 may include a first navigation sensor 408-1 disposed closer to a first end of the vehicle 400, and a second navigation sensor 408-2 disposed closer to a second end of the vehicle 400.

Although navigation by a vehicle having a magnetic sensor array, such as a Hall Effect sensor array, is described herein in detail, it is noted that a vehicle may additionally or alternatively have an optical sensor (e.g., an optical sensor array or image sensor), an RFID reader, or other type of navigation sensor for detecting a pattern of reference elements disposed in or on a road. In some examples, a Hall Effect sensor array may include 100 sensor elements disposed in a 2×50 grid of sensor elements. The sensor elements of such a Hall Effect sensor array may have an approximate 2 centimeter spacing, such that the sensor array spans about one meter. Alternatively, the sensor array may have more or fewer rows of sensor elements, with more or fewer sensor elements per row, with smaller or greater spacings between sensor elements.

As the vehicle 400 moves along the road 402, a sequence or pattern of reference elements 406 may pass under (or over or adjacent) the navigation sensor(s) 408 and be detected by the navigation sensor(s) 408. In some embodiments, the reference elements 406 may include magnetic markers, such as magnetic poles (e.g., magnetic north pole reference elements 406-1 and/or magnetic south pole reference elements 406-2). A reference element 406 may be detected by one or more sensor elements of the navigation sensor(s) 408. In some cases, a sensor element may be configured to output a signal indicating whether a reference element 406 is detected or not detected. In some cases, a sensor element may be configured to output a signal indicating whether and what kind of reference elements 406 are detected. For example, a sensor element may output a signed binary signal that indicates whether a magnetic north pole reference element 406-1 or a magnetic south pole reference element 406-2 is detected. In some cases, a sensor element may be configured to output a signal that indicates a relationship between the sensor element and a reference element 406. For example, a Hall Effect sensor element may output a signal indicating a polarity and strength of a magnetic field generated by one or more reference elements 406-1, 406-2, or an optical sensor element may output a signal indicating a portion of an optical indicia imaged by the optical sensor element. As another example, a vector magnetometer may output a signal indicating an x/y/z-direction of a magnetic field. A circuit or processor of a navigation system for the vehicle 400 may determine relationships between the signals generated by different sensor elements (e.g., relative sensor element readings) to determine the position, velocity, and/or orientation of one or more reference elements 406 with respect to a navigation sensor 408-1 or 408-2 as a whole. Additionally or alternatively, the circuit or processor may determine the position, velocity, and/or orientation of one or more reference elements 406 with respect to a navigation sensor 408-1 or 408-2 using the output of a single sensor element. The circuit or processor may determine a velocity of the vehicle 400 based on a known size or spacing between reference elements 406, and determined times between a sensor element's detection of sequential reference elements 406 along a lane 404 or road 402. Additionally or alternatively, the circuit or processor may determine a velocity of the vehicle 400 based on a known size or spacing between sensor elements 410, and determined times at which leading and trailing sensor elements 410 in an array of sensor elements 410 detect the same reference element 406. In some embodiments, a velocity of the vehicle 400 may be determined using the outputs of multiple sensor elements 410, in one or multiple navigation sensors 408.

In some embodiments, a navigation system within the vehicle 400 and/or in communication with the vehicle 400 (e.g., a vehicle navigation system) may determine a position, velocity, or orientation of a navigation sensor 408-1 or 408-2 (or a combination thereof) in relation to one or more reference elements 406 detected by the navigation sensor, and may use the position, velocity, or orientation of the navigation sensor 408-1 or 408-2 (or combination thereof) in relation to the one or more reference elements 406, in combination with a position and/or orientation of the navigation sensor 408-1 or 408-2 on the vehicle and a position and/or orientation of the reference element(s) 406 in or on the lane 404 or road 402, to determine a position, velocity, and/or orientation of the vehicle 400 in the lane 404 or on the road 402. The determined position of the vehicle 400 may be a fixed, absolute geographic location or a relative location in the lane 404 or along the road 402 (e.g., a distance that the vehicle 400 has traveled along the lane 404 or road 402). The determined position of the vehicle 400 may include a side-to-side position of the vehicle 400 in the lane 404 or on the road 402, or a position of the vehicle 400 with respect to left and right lane boundaries 412-1, 412-2. Upon determining that the position, velocity, and/or orientation of the vehicle 400 is not an expected or desired position, velocity, and/or orientation, the vehicle navigation system may provide a steering correction and/or a speed correction (e.g., one or more signals or instructions) to a steering system, drive system, and/or brake system of the vehicle 400. The steering system may move the wheels 414 of the vehicle 400 to steer the vehicle 400 to a desired position in the lane 404 or on the road 402, or to orient the vehicle 400 in a desired direction of travel along the lane 404 or road 402. The drive system or brake system may increase or decrease the speed of the vehicle 400.

In some embodiments, a lane 404 of a road 402 may include a singular column of reference elements 406. As used herein, a "column" of reference elements 406 runs along or parallel to a lane 404 (i.e., along an intended direction of vehicle travel). The column of reference elements 406 may be centered within the lane 404, or offset by a predetermined distance with respect to the center of the lane 404. Each of the reference elements 406 may be the same (e.g., a magnetic north pole reference elements 406-1), and a vehicle navigation system may determine a position and/or orientation of the vehicle 400 in the lane 404 or on the road 402 by determining a position and/or orientation of the navigation sensor(s) 408-1, 408-2 in relation to one or more of the reference elements 406, by determining spatial relationships between detected reference elements 406, by counting a detected number of reference elements 406, and so on. Alternatively, the reference elements 406 may include different kinds of reference elements (e.g., magnetic north pole reference elements 406-1 and magnetic south pole reference elements 406-2), and a vehicle navigation system may additionally or alternatively determine a position of the vehicle 400 along the lane 404 or in the road 402 by detecting predetermined sequences of the reference elements 406-1, 406-2 (e.g., predetermined magnetic polarity sequences). One example of a magnetic polarity sequence is the sequence S-S-N-N-N-N-N 416, in which N is a magnetic north pole reference element 406-1 and S is a magnetic south pole reference element 406-2. Other magnetic polarity sequences may be longer or shorter. In some cases, a predetermined sequence of reference elements 406-1, 406-2 may periodically repeat along the lane 404 or road 402. Alternatively, a predetermined sequence may continually change. As another alternative, a predetermined sequence may repeat within a predetermined geographic region, but different predetermined sequences may be used in different geographic regions. A vehicle's position with respect to a predetermined sequence, or a vehicle's position with respect to a predetermined reference element position within a predetermined sequence, may therefore convey a fixed, absolute geographic location of the vehicle 400 or a relative position (location) of the vehicle 400.

In some embodiments, a predetermined sequence of reference elements 406-1, 406-2 may include different spacings between the same or different types of reference elements 406-1, 406-2, or different sizes or strengths of the same or different types of reference elements 406-1, 406-2. In some embodiments, a predetermined sequence of reference elements 406-1, 406-2 may be replicated in two or more columns of reference elements 406-1, 406-2 that run along or parallel to a lane 404, or a pattern of reference elements 406-1, 406-2 may be distributed across two or more columns of reference elements 406-1, 406-2. When a lane 404 includes multiple columns of reference elements 406-1, 406-2, the columns of reference elements 406-1, 406-2 may or may not overlap.

In some embodiments, the vehicle 400 may navigate the road 402 using information in addition to or instead of information derived from its detection of the reference elements 406 disposed in or on the road 402. For example, the vehicle 400 may navigate the road 402 using an electronic map of the reference elements 406, map information received from a geographic map provider or a map application, map information or coordinates received from a geographic positioning system (GPS), positioning information received from other vehicles (e.g., vehicle-to-vehicle (V2V) information, or other information derived from nearby vehicles), wheel and/or visual odometry measurements (e.g., measurements obtained from one or more wheel sensors on-board the vehicle 400, or images or video obtained from one or more image sensors or cameras on-board the vehicle 400), positioning information received over a wireless communication band (e.g., a radio frequency (RF) band), radar or LIDAR information, and so on. In some cases, the vehicle 400 may use any or all of this information to predict a location of (or direction to) a next reference element 406, and may provide a steering correction to its steering system or speed correction to its drive system or brake system (as needed) to navigate along a path that includes the next reference element. In some embodiments, the vehicle 400 may rely on wheel odometry information alone to predict a location of (or direction to) a next reference element 406.

Figure 5:
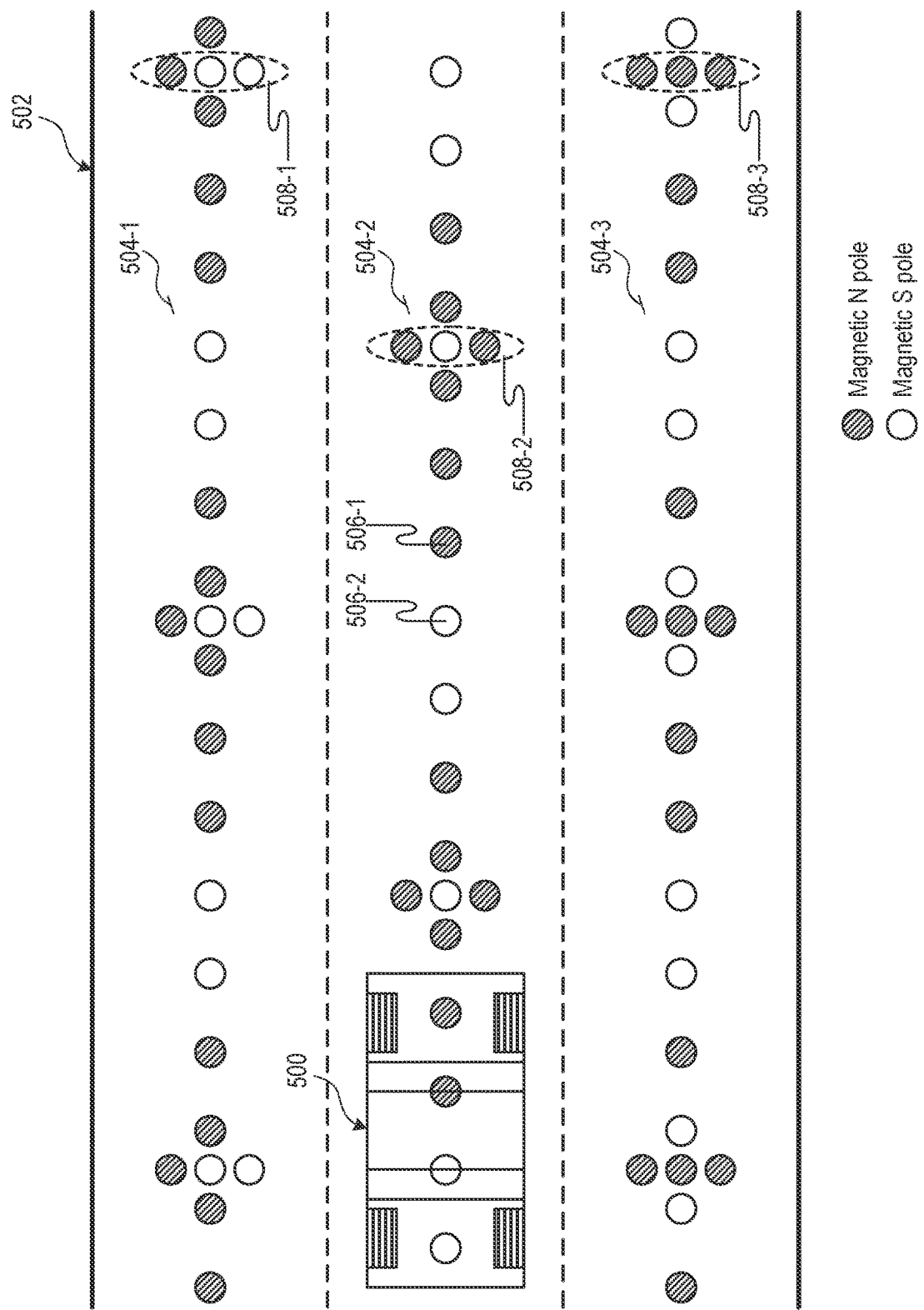
FIG. 5 shows a top plan view of an example vehicle on another example road.

Turning now to FIG. 5, there is shown a top plan view of an example vehicle 500 on another example road 502. By way of example, the road 502 is shown to include three lanes 504-1, 504-2, 504-3. In alternative embodiments, the road 502 may include any number of one or more lanes 504. In some embodiments, the vehicle 500 may be one of the vehicles described with reference to FIGS. 1A-3B or 4A, or may incorporate aspects of the vehicles described with reference to FIGS. 1A-3B or 4A.

Each lane 504 of the road 502 may include a sequence or pattern of reference elements 506-1, 506-2 disposed in or on the road 502, as described for example with reference to FIGS. 4A & 4B. In some cases, each lane 504 may include a periodic sequence of reference elements 506-1, 506-2 (e.g., a coded marker) that serves as a lane identifier 508-1, 508-2, 508-3. For example, a first lane 504-1 may include an N-S-S sequence of magnetic pole reference elements 506-1, 506-2 that serves as a first lane identifier 508-1, a second lane 504-2 may include an N-S-N sequence of magnetic pole reference elements 506-1, 506-2 that serves as a second lane identifier 508-2, and a third lane 504-3 may include an N-N-N sequence of magnetic pole reference elements 506-1 that serves as a third lane identifier 508-3. As shown in FIG. 5, each sequence of reference elements that serves as a lane identifier 508 may be disposed transverse to an intended direction of vehicle movement along a lane 504, and may be periodically repeated along the lane 504. Alternatively, the reference elements 506 included in each lane identifier 508 may be disposed parallel to the intended direction of vehicle movement along a lane 504, or oriented in different ways. In some embodiments, all of the lane identifiers 508 may include the same sequence of reference elements 506, but the sequence of reference elements 506 may be oriented different ways in different lanes 504. In some embodiments, lanes 504 may be identified by two-dimensional patterns of reference elements 506 instead of sequences of reference elements 506. Different lane identifiers 508 may also or alternatively include different spacings between reference elements 506, different sizes or strengths of reference elements 506, and so on.

In some embodiments, periodic lane identifiers 508 may be separated by other reference elements 506. In some cases, the other reference elements 506 may include other sequences of reference elements. For example, instances of a periodic lane identifier 508-1 may be separated by a predetermined sequence of reference elements that define the magnetic polarity sequence N-N-S-S-N-N-N). The same predetermined sequence of reference elements may be used to separate instances of lane identifiers 508 in all lanes 504 of a road 502, or different predetermined sequences of reference elements may be used to separate instances of lane identifiers 508 in different lanes 504. In alternative embodiments, a set of one or more reference elements of the same type (e.g., a sequence of only magnetic north pole reference elements 506-1) may be used to separate consecutive instances of a lane identifier 508 disposed in or on a road 502. The reference elements 506 disposed in different lanes 504 may be aligned or not aligned (e.g., staggered or offset with respect to the reference elements 506 included in other lanes 504).

In addition to, or instead of, sequences or patterns of reference elements 506 that serve as lane identifiers 508, a lane 504 of a road 502 may include sequences or patterns of reference elements 506 that provide other information to a vehicle 500. For example, a predetermined sequence or pattern of reference elements 506 may indicate that a vehicle 500 is approaching an intersection, that a vehicle 500 is at a particular fixed, absolute geographic location, and so on.

In some embodiments, reference elements may be disposed between lanes 504 instead of within lanes 504, or within and between lanes 504, or in a manner that is independent of lanes 504. In some embodiments, a central operations system external to the vehicle 500 (e.g., a system including a traffic controller) may determine a traffic density that is needed for the road 502, and may semi-statically or dynamically determine a number of lanes 504 that are needed to support the traffic density. Thus, for example, the road 502 may be configured with three lanes 504 in a default lane configuration, but configured with four lanes 504 in a high traffic density configuration. When the number of lanes 504 is changed, the central operations system may signal to vehicles (e.g., the vehicle 500) that the number of lanes 504 has changed, and instruct vehicles on an expected spatial relationship between their navigation sensors and the reference elements 506 that pass under their navigation sensors.

Figure 6:
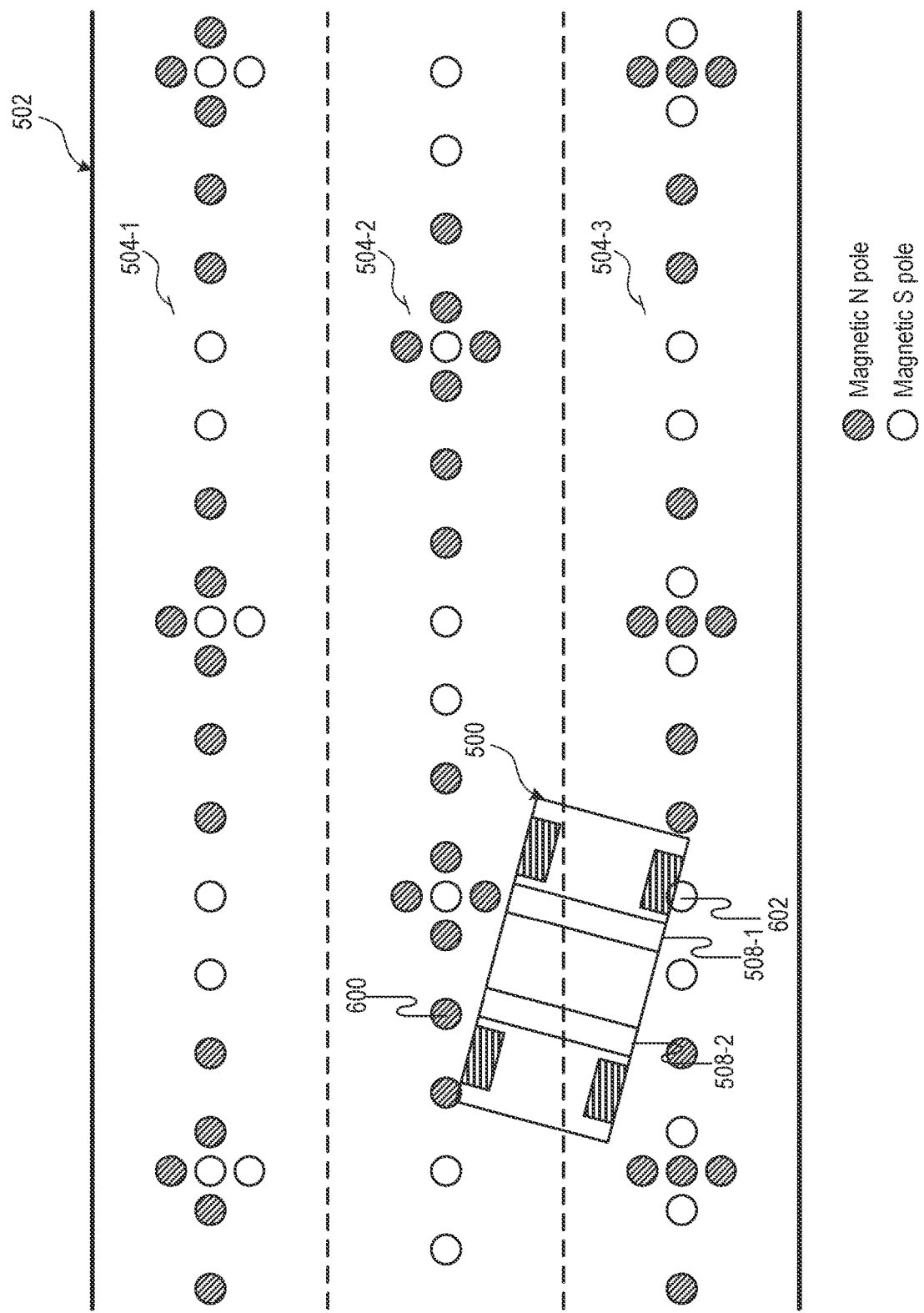
FIG. 6 shows the vehicle and road described with reference to FIG. 5 as the vehicle executes a lane change, from the second lane to the third lane.

FIG. 6 shows the vehicle 500 and road 502 described with reference to FIG. 5 as the vehicle 500 executes a lane change, from the second lane 504-2 to the third lane 504-3. As shown, there may be a point at which the vehicle's navigation sensor(s) 508-1, 508-2 is/are between lanes 504. Prior to the vehicle position shown in FIG. 6, the vehicle 500 may detect reference elements disposed in or on the road 502 in the second lane 504-2 (e.g., up to and including a last detected reference element 600 in the second lane 504-2). Subsequent to the vehicle position shown in FIG. 6, the vehicle 500 may begin detecting reference elements 506 disposed in or on the road 502 in the third lane 504-3 (e.g., beginning with a first detected reference element 602 in the third lane 504-3). Between the last detected reference element 600 in the second lane 504-2 and the first detected reference element 602 in the third lane 504-3, the vehicle 500 may pass one or more reference elements 506 positioned along the second lane 504-2 and one or more reference elements 506 positioned along the third lane 504-3. A vehicle navigation system may navigate the lane change in various ways. For example, the vehicle navigation system may rely on map information for the reference elements 506 included in the road 502, map information received from a geographic map provider or a map application, map information or coordinates received from a geographic positioning system (GPS), positioning information received from other vehicles (e.g., vehicle-to-vehicle (V2V) information, or other information derived from nearby vehicles), wheel and/or visual odometry measurements (e.g., measurements obtained from one or more wheel sensors on-board the vehicle 500, or images or video obtained from one or more image sensors on-board the vehicle 500), positioning information received over a wireless communication band (e.g., a radio frequency (RF) band), radar or LIDAR information, and so on.

Figure 7:
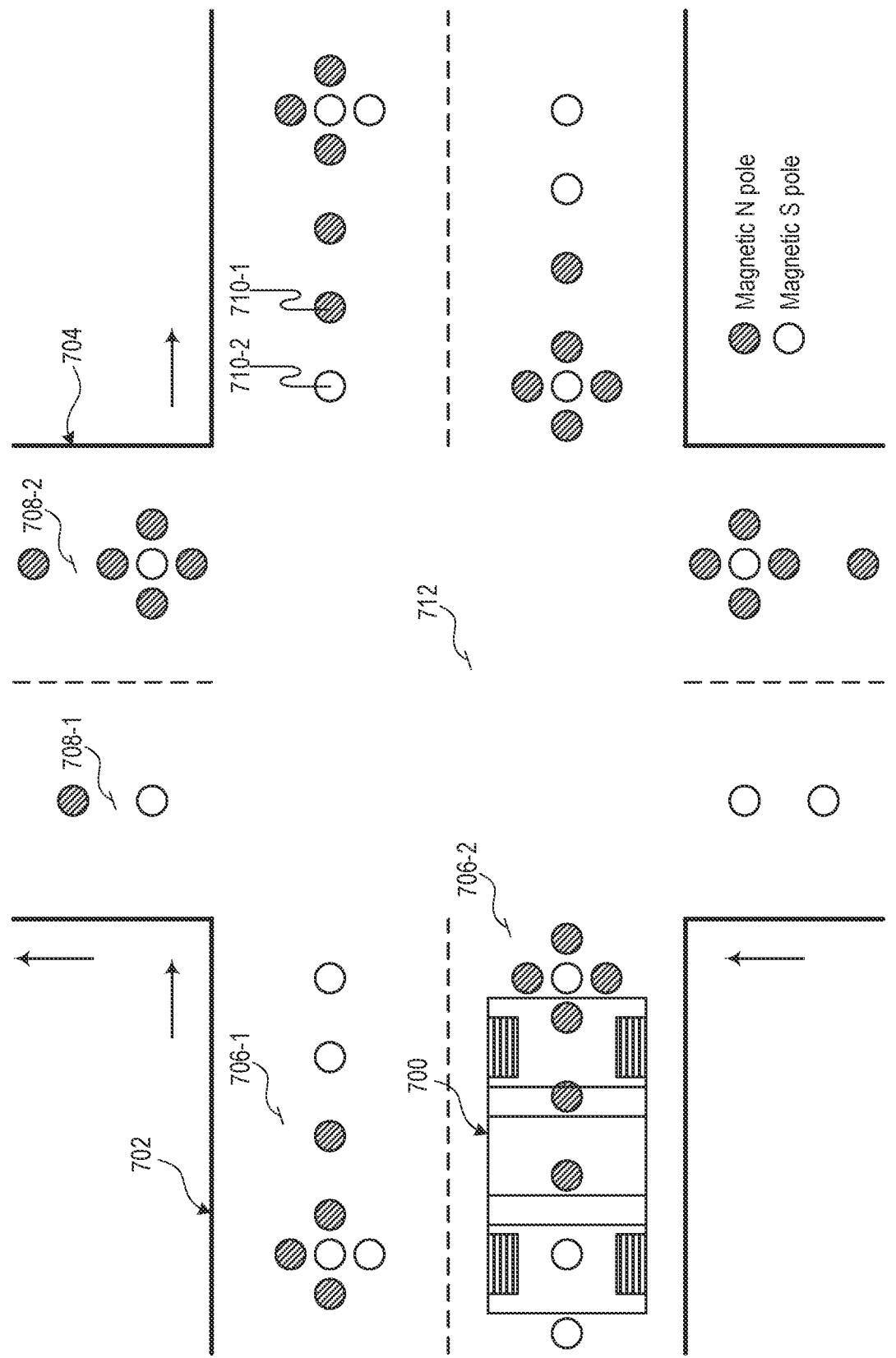
FIG. 7 shows a top plan view of an example vehicle on another example road.

FIG. 7 shows a top plan view of an example vehicle 700 on another example road 702. By way of example, the road 702 is a two lane road that intersects another two lane road 704. In alternative embodiments, the roads 702, 704 may include any number of one or more lanes. Although the roads are shown to be one-way roads, the roads 702, 704 could alternatively be two-way roads. In some embodiments, the vehicle 700 may be one of the vehicles described with reference to FIGS. 1A-3B, 4A, or 5, or may incorporate aspects of the vehicles described with reference to FIGS. 1A-3B, 4A, or 5.

Each lane 706-1, 706-2, 708-1, 708-2 of each road 702, 704 may include a pattern of reference elements 710-1, 710-2 disposed in or on the road 702, 704, as described for example with reference to FIGS. 4A-4B & 5. By way of example, there are no reference elements in the intersection 712. A vehicle 700 that crosses the intersection 712 or makes a turn at the intersection 712 may navigate crossing the intersection 712 or making a turn similarly to how a vehicle may navigate a lane change. For example, a vehicle navigation system may rely on map information for the reference elements 710 included in the roads 702, 704, map information received from a geographic map provider or a map application, map information or coordinates received from a GPS, positioning information received from other vehicles (e.g., V2V information, or other information derived from nearby vehicles), wheel and/or visual odometry measurements (e.g., measurements obtained from one or more wheel sensors on-board the vehicle 700, or images or video obtained from one or more image sensors on-board the vehicle 700), positioning information received over a wireless communication band (e.g., an RF band), radar or LIDAR information, and so on.

In an alternative embodiment of the intersection 712, reference elements 710 for the lanes 706-1, 706-2, 708-1, 708-2 of one or both roads 702, 704 may extend into the intersection 712. In some embodiments, the reference elements 710 of intersecting lanes (e.g., lane 706-1 and lane 708-1) may be shared by the intersecting lanes. In other embodiments, intersecting lanes may be allocated separate and distinct reference elements 710 within the intersection 712.

Figure 8:
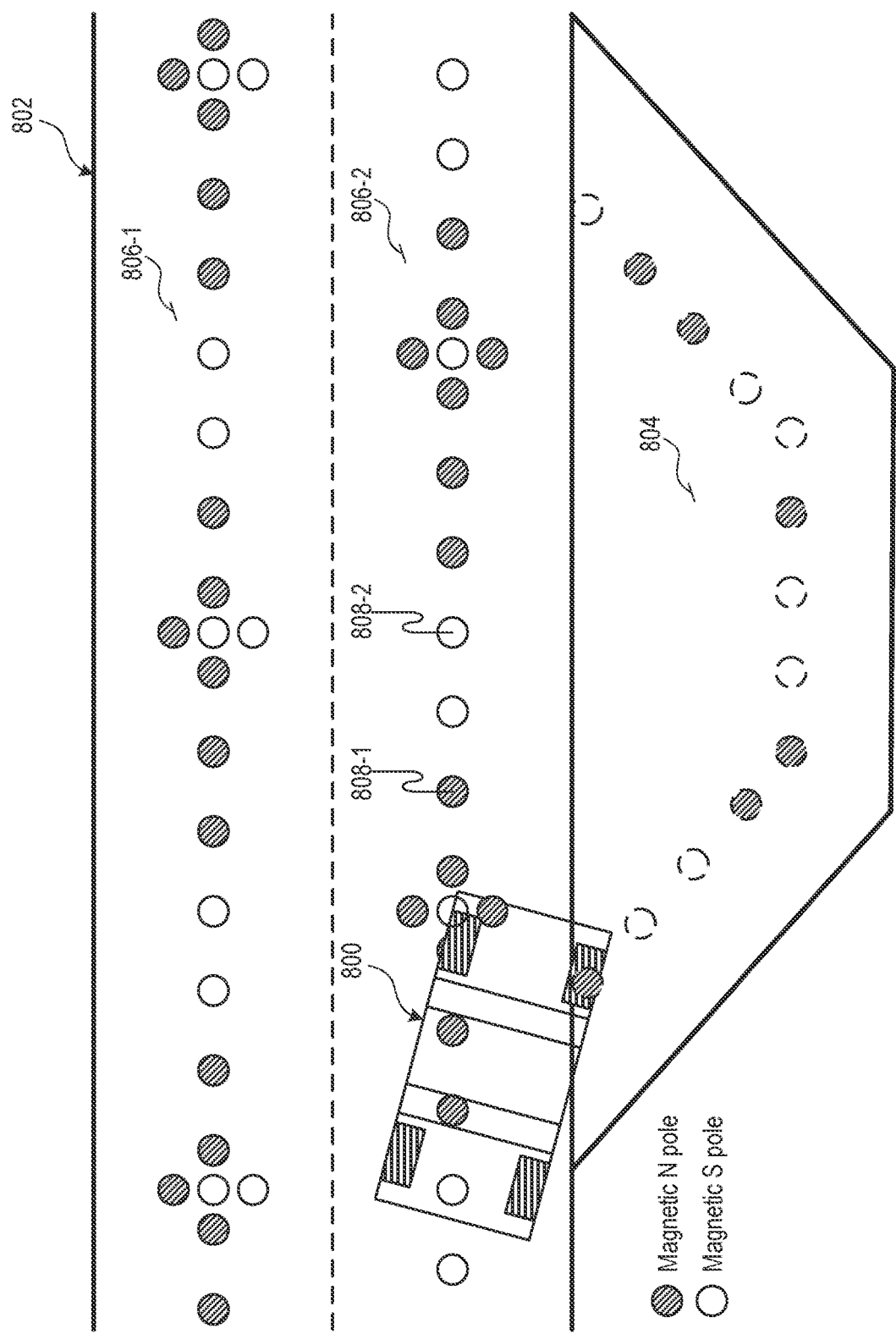
FIG. 8 shows a top plan view of an example vehicle on another example road.

FIG. 8 shows a top plan view of an example vehicle 800 on another example road 802. By way of example, the road 802 is a two lane road with a pull out 804 (e.g., a passenger or package pick-up and drop-off location). In some embodiments, the vehicle 800 may be one of the vehicles described with reference to FIGS. 1A-3B, 4A, 5, or 7, or may incorporate aspects of the vehicles described with reference to FIGS. 1A-3B, 4A, 5, or 7.

Each lane 806-1, 806-2 of the road 802 may include a pattern of reference elements 808-1, 808-2 disposed in or on the road 802, as described for example with reference to FIGS. 4A-4B & 5. In some embodiments, there may be no reference elements in the pull-out 804. A vehicle 800 may navigate entering the pull-out 804 and/or returning to a lane of the road 802 similarly to how a vehicle navigates a lane change or intersection. For example, a vehicle navigation system may rely on map information for the reference elements 808 included in the road 802, map information received from a geographic map provider or a map application, map information or coordinates received from a GPS, positioning information received from other vehicles (e.g., V2V information, or other information derived from nearby vehicles), wheel and/or visual odometry measurements (e.g., measurements obtained from one or more wheel sensors on-board the vehicle 800, or images or video obtained from one or more image sensors on-board the vehicle 800), positioning information received over a wireless communication band (e.g., an RF band), radar or LIDAR information, and so on.

In some embodiments, and as shown in phantom in FIG. 8, a number of reference elements 808-1, 808-2 may be disposed to define a navigation path within the pull-out 804, and a vehicle 800 may navigate into and out of the pull-out 804 using the reference elements 808-1, 808-2 disposed along the navigation path within the pull-out. In some embodiments, a vehicle 800 may determine the location of the pull-out 804 using information received from a map, information included in a lane 806 of the road 802 (e.g., a sequence or pattern of reference elements 808 indicating that the pull-out 804 is near), or other information provided to or determined by the vehicle 800.

A vehicle that is operated without a driver, such as one of the vehicles described herein, may in some cases be operated as a state machine—i.e., as a device that transitions to a new state of operation based on its current state of operation and the value(s) of one or more inputs. A vehicle may transition to a new state of operation, for example, upon determining that it has to change lanes, cross an intersection, turn onto a new road, enter or exit a pull-out, stop to drop off a passenger or cargo, and so on.

Figure 9A:
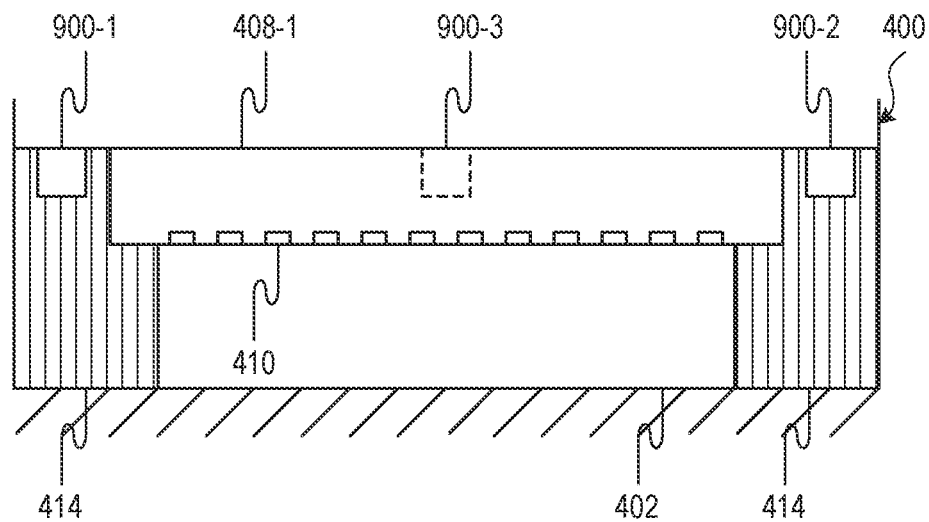
FIGS. 9A & 9B show example elevations of the navigation sensor described with reference to FIGS. 4A & 4B.
Figure 9B:
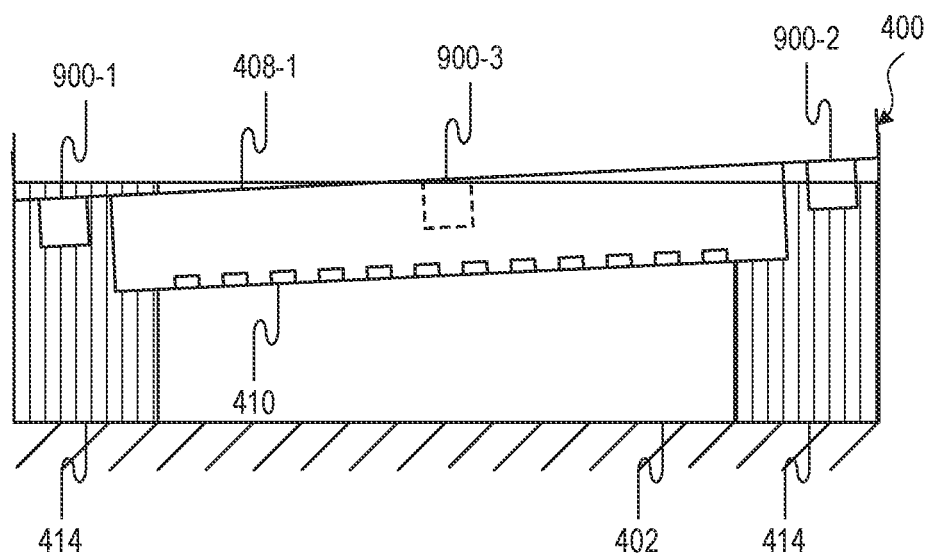

FIGS. 9A & 9B show example elevations of the vehicle 400, navigation sensor 408-1, and wheels 414 described with reference to FIG. 4A. The elevations are shown with reference to the road 402. As shown with reference to FIG. 9A, the sensor elements 410 of the navigation sensor 408-1 are preferably disposed in a plane parallel to the road 402 (i.e., parallel to the surface of the road 402). However, at times, the sensor elements 410 may be disposed in a plane that is skewed (or pitched) with respect to the road 402, as shown in FIG. 9B. When the sensor elements 410 are disposed in a skewed plane, the signals output by the sensor elements 410 may differ from the signals that would otherwise be output by the sensor elements 410 when the sensor elements 410 are disposed in a plane parallel to the road 402, and a vehicle navigation system may determine an incorrect position, velocity, and/or orientation of the vehicle 400. To correct for such skew, the vehicle 400 may use information derived from one or more level sensors 900 (e.g., one level sensor 900-1 positioned to the left of the vehicle 400 and one level sensor 900-2 positioned to the right of the vehicle 400, or three or four level sensors (e.g., level sensors 900-1, 900-2, and 900-3) arranged in a two-dimensional array) or height sensors to adjust (e.g., correct) the signals output from an array of sensor elements 410. In some examples, each of the level sensors 900 may include a laser time-of-flight (ToF) sensor. In some examples, the level sensors 900 may be attached to a frame structure of the vehicle 400, to a body of the vehicle 400, to a suspension system of the vehicle 400, or to a navigation sensor 408 (e.g., navigation sensor 408-1).

Figure 10:
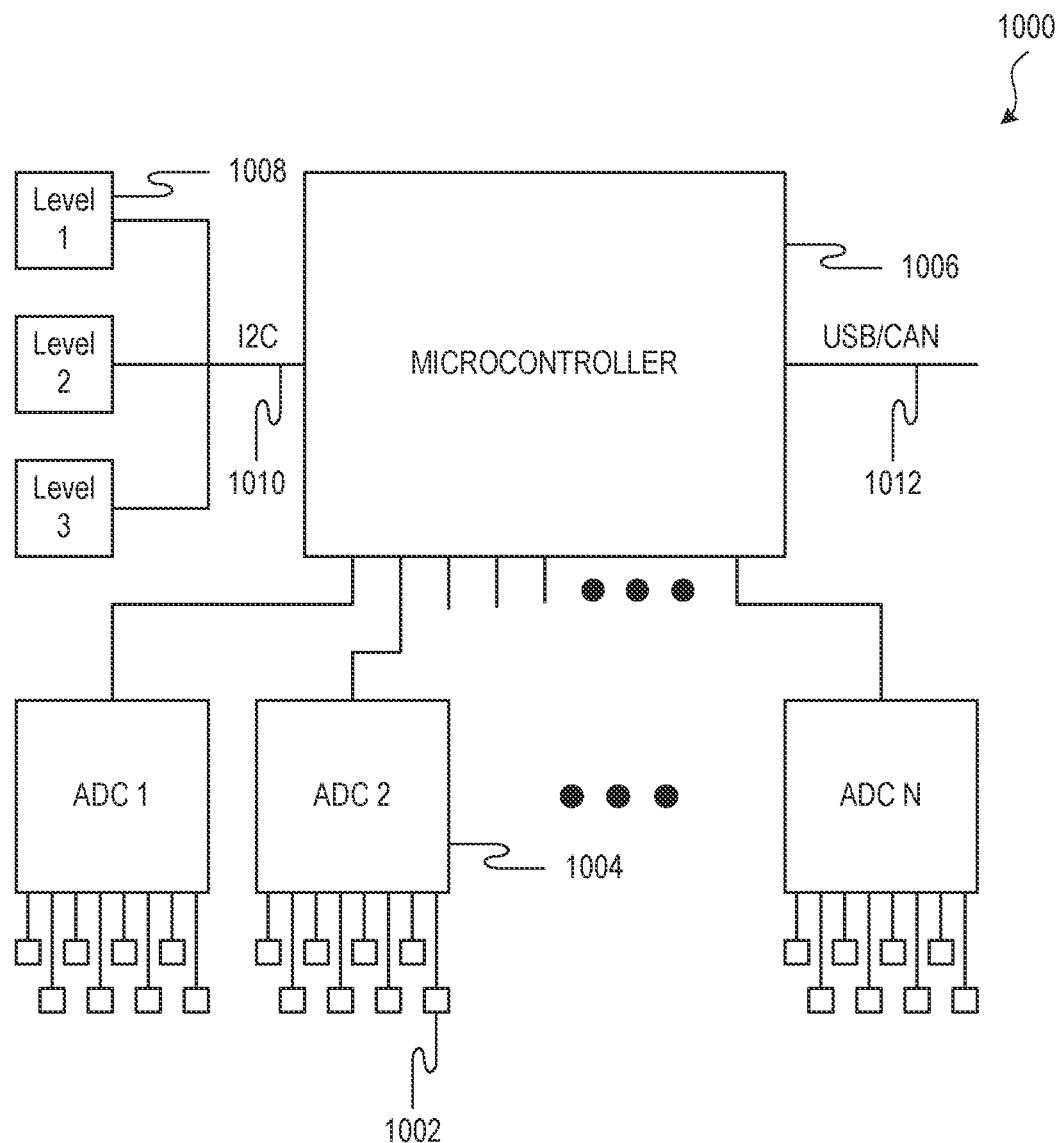
FIG. 10 shows an example circuit for adjusting the outputs of sensor elements to account for skew of a sensor array with respect to a road surface.

FIG. 10 shows an example circuit 1000 for adjusting the outputs of sensor elements to account for skew of a sensor array with respect to a road. The circuit 1000 includes a set of one or more analog-to-digital converters (ADCs) 1004, each of which is coupled to a set of one or more sensor elements 1002. The digitized signals (or digitized outputs) of the sensor elements may be provided to a control circuit 1006 (e.g., a microcontroller or other processor) that receives the outputs of the ADCs 1004. Signals (e.g., digitized signals) output by a set of one or more level sensors 1008 (e.g., three level sensors 1008) may also be provided to the control circuit 1006. In some embodiments, the digitized signals output by the level sensors 1008 may be provided to the control circuit 1006 over an I2C bus 1010 or other means. The control circuit 1006 may adjust the digitized outputs of the sensor elements in response to the digitized outputs of the level sensors, and may output adjusted digitized outputs of the sensor elements. In some embodiments, the adjusted digitized outputs of the sensor elements may be output over a bus 1012 such as a universal serial bus (USB) or a controller area network (CAN) bus.

Figure 11:
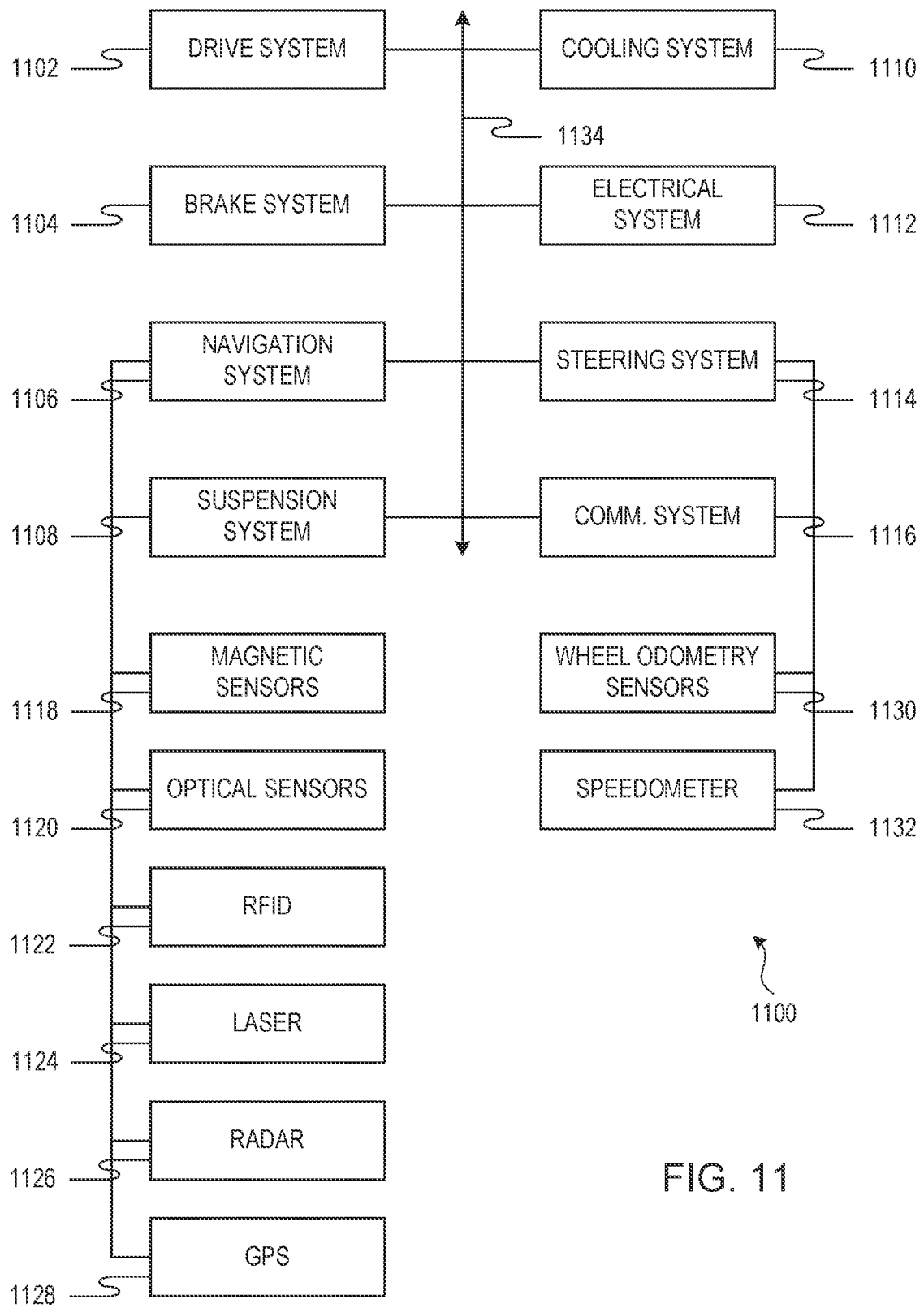
FIG. 11 shows an example system level block diagram of a vehicle.

FIG. 11 shows an example system level block diagram 1100 of a vehicle. The vehicle may various include a drive system 1102, a brake system 1104, a navigation system 1106, a suspension system 1108, a cooling system 1110, an electrical system 1112, a steering system 1114, and/or a communication system 1116. The vehicle may also include other and/or different systems. The systems may communicate with each other over one or more buses or networks 1134.

The drive system 1102 may include elements that provide power to other systems, in addition to a motive force for moving the vehicle. The brake system 1104 may include elements (e.g., rotors and brake pads) for stopping the vehicle or limiting the motive force provided to the wheels of the vehicle.

The navigation system 1106 may include one or more sensors, which sensors are coupled to one or more processors that control or provide feedback to other systems of the vehicle, such as the drive system, the brake system, or the steering system. The sensors included or accessed by the navigation system may include magnetic sensors 1118, optical sensors 1120, RFID readers 1122, lasers 1124, a radar system 1126, a GPS 1128, and so on, as described in more detail elsewhere in this disclosure.

The cooling system 1110 may include one or more fans, vents, liquid cooling paths, and so on. The electrical system 1112 may provide power to, and communication between, other systems, and may include sensors, instruments, and displays for example.

The steering system 1114 may include electrically, hydrostatically, magnetically, or otherwise actuated components for steering the vehicle. The steering system 1114 may include, for example, wheel odometry sensors, a speedometer, and so on).

The communication system 1116 may include one or more wireless interfaces (e.g., RF, Wi-Fi, cellular, or optical interfaces) for communicating with other vehicles, or with control or monitoring systems external to the vehicle.

Figure 12:
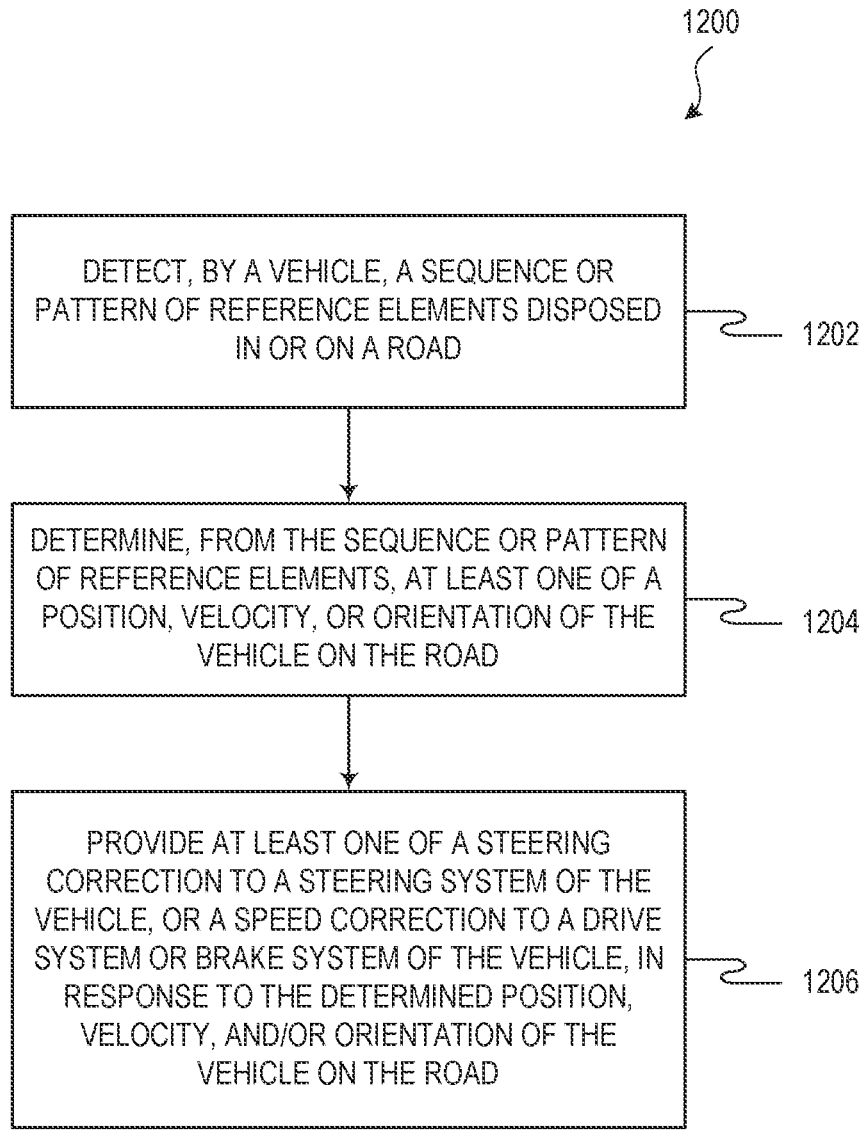
FIG. 12 shows an example method of navigating a road by a vehicle.

FIG. 12 shows an example method 1200 of navigating a road by a vehicle. The method 1200 may include, for example, detecting, by the vehicle, a sequence or pattern of reference elements disposed in or on a road over which the vehicle travels (at block 1202). At block 1204, the method 1200 may include determining, from the sequence or pattern of reference elements, at least one of a position, velocity, or orientation of the vehicle on the road. At block 1206, the method 1200 may include providing a steering correction to a steering system of the vehicle in response to the determined position, velocity, and/or orientation of the vehicle on the road. Additionally or alternatively, the operation(s) at block 1206 may include providing a speed correction to a drive system or brake system of the vehicle in response to the determined position, velocity, and/or orientation, or taking other actions in response to the determined position, velocity, and/or orientation of the vehicle.

In some embodiments, the method 1200 may include other operations, or may be alternatively configured, as described herein.

Figure 13:
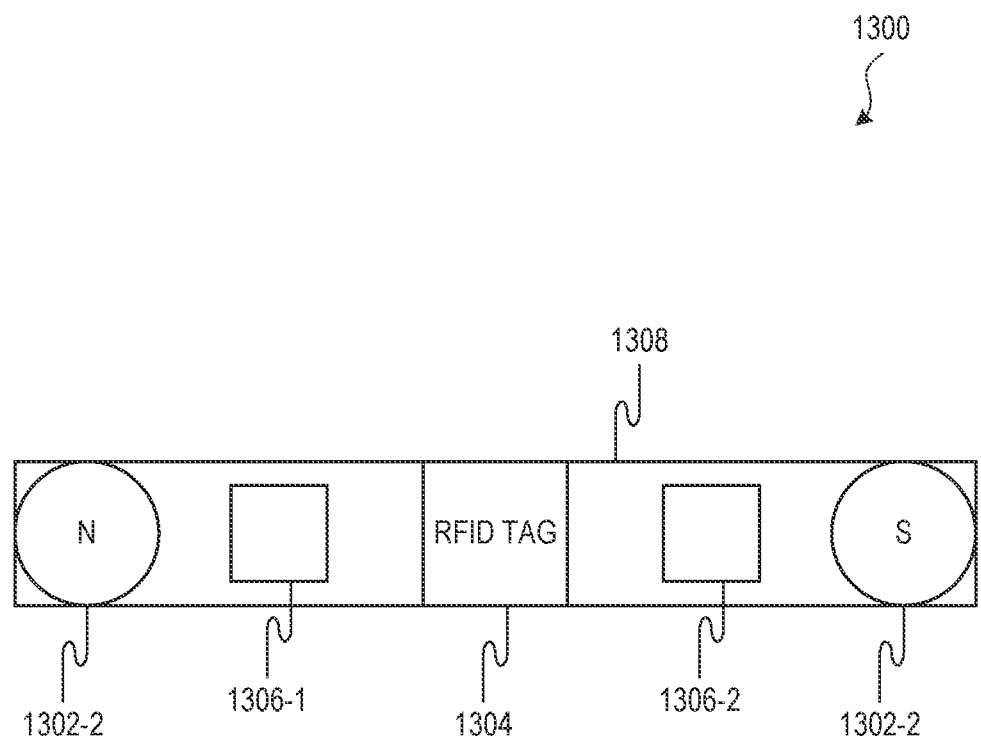
FIG. 13 shows an example composite structure including a combination of reference elements that may be embedded in or attached to a surface of a road.

Turning now to FIG. 13, there is shown an example composite structure 1300 including a combination of reference elements (fiducials) that may be embedded in or attached to a surface of a road. By way of example, the composite structure 1300 includes one or more magnets 1302-1, 1302-2. In some embodiments, the composite structure 1300 may include a first magnet 1302-1, having an upward-facing magnetic north pole, at one end of the composite structure 1300, and a second magnet 1302-2, having an upward-facing magnetic south pole, at an opposite end of the composite structure 1300. An RFID tag 1304 may be provided between the magnets 1302-1, 1302-2, and corner-cube reflectors or other optical element with high optical contrast 1306-1, 1306-2 (detectable by laser/radar sensors) may be disposed between the RFID tag 1304 and each magnet 1302-1, 1302-2. All of the reference elements may be packaged in or attached to a frame 1308 (e.g., a plastic frame). In alternative embodiments, the reference elements included in the composite structure 1300 may be re-arranged, or a different combination of reference elements may be included. By incorporating different kinds of reference elements into a road, a vehicle may determine its position, velocity, and/or orientation with respect to the road using redundant navigation methods, thereby increasing the robustness of the vehicle's navigation system.

In some road embodiments, each reference element disposed in or on the road (or at least some of the reference elements disposed in or on the road) may be the composite structure shown in FIG. 13. In some cases, the same composite structure may be oriented different ways in different lanes of a road, with the different orientations serving as lane identifiers. Instances of the composite structure may also or alternatively be spaced differently in different lanes, and the different lanes may be identified by the different spacings.

In some embodiments, magnetic markers or other reference elements may be separately disposed in or on a road. In the case of magnetic markers, a magnet may be oriented in a road with its magnetic north pole facing up, with its magnetic south pole facing up, with both of its poles positioned in a plane parallel to a road surface, or with its magnetic poles skewed (pitched with respect to the road surface) in various ways to alter a magnetic field created above the road surface. In the case of a magnet, the magnet may be disposed in a trough formed in the rough surface, or may be buried under the road surface (e.g., in the road). In some cases, a magnetic marker may be formed of magnetic neodymium. In some embodiments, magnets (or magnetic poles) may be disposed in or on a road to indicate a direction of traffic flow.

In some embodiments, a road may include a composite material such as concrete or asphalt, and a set of magnetic markers may be disposed in or on the composite material. In some embodiments, a road may be formed by placing and connecting pre-fabricated road segments. Each of the pre-fabricated road segments may include one or more reference elements disposed at predetermined locations.

In some embodiments, rebar and/or magnetic markers may be selectively positioned within a road such that the rebar shapes or increases the magnetic field formed above the road by the magnetic markers.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. For example, while the methods or processes disclosed herein have been described and shown with reference to particular operations performed in a particular order, these operations may be combined, sub-divided, or re-ordered to form equivalent methods or processes without departing from the teachings of the present disclosure. Moreover, structures, features, components, materials, steps, processes, or the like, that are described herein with respect to one embodiment may be omitted from that embodiment or incorporated into other embodiments.

What is claimed is:

1. A vehicle, comprising:
 a vehicle control system, comprising:
  a navigation sensor; and
  a processor in communication with the navigation sensor; wherein:
 the vehicle control system is configured to:
  in accordance with a determination that the vehicle is travelling along a first segment of a road having reference elements positioned along the first segment of the road, operate the vehicle according to a first mode of operation, including:
   detecting, with the navigation sensor, at least a subset of the reference elements;
   determining, based at least in part on the detected reference elements, one or more vehicle operational parameters, the one or more vehicle operational parameters including at least one of a position, velocity, or orientation of the vehicle; and
   performing at least one of accelerating, decelerating, or steering the vehicle in response to the determined one or more vehicle operational parameters;
  detect a transition from the first segment of the road to a second segment of the road, the second segment lacking reference elements positioned along the second segment of the road; and
  in accordance with a determination that the vehicle is travelling along the second segment of the road, operate the vehicle in a second mode of operation, including performing at least one of accelerating, decelerating, or steering the vehicle based at least in part on images captured by an image sensor on the vehicle.

2. The vehicle of claim 1, wherein the processor is configured to determine, based at least in part on the detected reference elements, a lane in which the vehicle is positioned on the road.

3. The vehicle of claim 1, wherein the vehicle is under autonomous control in the first mode of operation and in the second mode of operation.

4. The vehicle of claim 1, wherein the reference elements are selected from the group consisting of: magnets; signs; fiducials; and radio frequency identification tags.

5. The vehicle of claim 1, wherein the image sensor is configured to detect the reference elements.

6. The vehicle of claim 1, wherein the second road segment corresponds to at least one of an intersection or a passenger boarding location.

7. The vehicle of claim 1, wherein:
 the navigation sensor comprises a first navigation sensor;
 the vehicle control system comprises a second navigation sensor in communication with the processor;
 the first navigation sensor is disposed closer to a first end of the vehicle than a second end of the vehicle, the second end being opposite the first end; and
 the second navigation sensor is disposed closer to the second end of the vehicle than the first end of the vehicle.

8. A method of navigating a road by a vehicle, comprising:
 at a vehicle that is travelling along a road:
  in accordance with a determination that the vehicle is travelling along a first segment of the road having reference elements positioned along the first segment of the road, operating the vehicle according to a first mode of operation, including:
  detecting, by the vehicle, at least a subset of the reference elements;
  determining, based at least in part on the detected reference elements, one or more vehicle operational parameters, the one or more vehicle operational parameters including at least one of a position, velocity, or orientation of the vehicle; and
  performing at least one of accelerating, decelerating, or steering the vehicle in response to the determined one or more vehicle operational parameters; and
  detecting a transition from the first segment of the road to a second segment of the road, the second segment lacking reference elements positioned along the second segment of the road; and
  in accordance with a determination that the vehicle is travelling along the second segment of the road, operating the vehicle in a second mode of operation, including performing at least one of accelerating, decelerating, or steering the vehicle based at least in part on images captured by an image sensor on the vehicle.

9. The method of claim 8, wherein the processor is configured to determine, based at least in part on the detected reference elements, a lane in which the vehicle is positioned on the road.

10. The method of claim 8, wherein the vehicle is under autonomous control in the first mode of operation and in the second mode of operation.

11. The method of claim 8, wherein the reference elements are selected from the group consisting of: magnets; signs; fiducials; and radio frequency identification tags.

12. The method of claim 8, wherein the image sensor is configured to detect the reference elements.

13. The method of claim 8, wherein the second road segment corresponds to at least one of an intersection or a passenger boarding location.

14. The method of claim 8, wherein:
  the navigation sensor comprises a first navigation sensor;
  the vehicle control system comprises a second navigation sensor in communication with the processor;
  the first navigation sensor is disposed closer to a first end of the vehicle than a second end of the vehicle, the second end being opposite the first end; and
  the second navigation sensor is disposed closer to the second end of the vehicle than the first end of the vehicle.

15. An autonomous vehicle system comprising:
a road having:
  a first segment having reference elements positioned along the road;
  a second road segment lacking reference elements positioned along the road; and
a driverless vehicle configured to travel along the road and having a vehicle control system configured to:
  in accordance with a determination that the driverless vehicle is travelling along the first segment of the road, operate the driverless vehicle according to a first mode of operation, including:
    detecting, with a navigation sensor coupled to the driverless vehicle, at least a subset of the reference elements;
    determining, based at least in part on the detected reference elements, one or more vehicle operational parameters, the one or more vehicle operational parameters including at least one of a position, velocity, or orientation of the vehicle; and
    performing at least one of accelerating, decelerating, or steering the driverless vehicle in response to the determined one or more vehicle operational parameters;
  detect a transition from the first segment of the road to the second segment of the road; and
  in accordance with a determination that the driverless vehicle is travelling along the second segment of the road, operate the driverless vehicle in a second mode of operation, including performing at least one of accelerating, decelerating, or steering the driverless vehicle based at least in part on images captured by an image sensor on the driverless vehicle.

16. The autonomous vehicle system of claim 15, wherein the processor is configured to determine, based at least in part on the detected reference elements, a lane in which the vehicle is positioned on the road.

17. The autonomous vehicle system of claim 15, wherein the vehicle is under autonomous control in the first mode of operation and in the second mode of operation.

18. The autonomous vehicle system of claim 15, wherein the reference elements are selected from the group consisting of: magnets; signs; fiducials; and radio frequency identification tags.

19. The autonomous vehicle system of claim 15, wherein the image sensor is configured to detect the reference elements.

20. The autonomous vehicle system of claim 15, wherein the second road segment corresponds to at least one of an intersection or a passenger boarding location.

* * * * *